(12) United States Patent
Greene et al.

(10) Patent No.: US 7,831,391 B2
(45) Date of Patent: *Nov. 9, 2010

(54) USING SEGMENTED CONES FOR FAST, CONSERVATIVE ASSESSMENT OF COLLISION RISK

(75) Inventors: Daniel H. Greene, Sunnyvale, CA (US); Juan Liu, Milpitas, CA (US); James E. Reich, San Francisco, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 686 days.

This patent is subject to a terminal disclaimer.

(21) Appl. No.: 11/818,191

(22) Filed: Jun. 12, 2007

(65) Prior Publication Data

US 2008/0312833 A1      Dec. 18, 2008

(51) Int. Cl.
G08G 1/16         (2006.01)
(52) U.S. Cl. .................. 701/301; 340/436; 340/903; 382/154
(58) Field of Classification Search ........... 340/436, 340/903, 435; 701/301, 1, 211, 216; 342/70; 382/103, 104, 107, 154; 348/148; 700/245
See application file for complete search history.

(56) References Cited

U.S. PATENT DOCUMENTS

| | | | | |
|---|---|---|---|---|
| 5,347,459 A | * | 9/1994 | Greenspan et al. | 700/255 |
| 5,572,428 A | * | 11/1996 | Ishida et al. | 701/301 |
| 5,594,414 A | * | 1/1997 | Namngani | 340/436 |
| 6,327,536 B1 | * | 12/2001 | Tsuji et al. | 701/301 |
| 6,714,139 B2 | * | 3/2004 | Saito et al. | 340/903 |
| 6,859,731 B2 | * | 2/2005 | Takafuji et al. | 701/301 |
| 7,356,408 B2 | * | 4/2008 | Tsuchiya et al. | 701/211 |

* cited by examiner

*Primary Examiner*—Khoi Tran
*Assistant Examiner*—Stephen Holwerda
(74) *Attorney, Agent, or Firm*—Park, Vaughan, Fleming & Dowler LLP; Shun Yao

(57) ABSTRACT

One embodiment of the present invention provides a system that facilitates assessment of collision between a primary principal and a non-primary principal for early warning. During operation, the system receives information which indicates a state of the primary principal and a state of the non-primary principal. The system divides future time into a number of time intervals, and estimates a number of possible future states of the primary and non-primary principals, wherein each future state corresponds to a time interval. The system further represents the possible future states of the primary or non-primary principal as one or more geometric objects in a space of which at least one dimension indicates the time. In addition, the system determines a probability of collision between the primary and non-primary principals based on the geometric objects.

29 Claims, 14 Drawing Sheets

USING SEGMENTED CONES FOR FAST, CONSERVATIVE ASSESSMENT OF COLLISION RISK

RELATED APPLICATION

This application is related to pending U.S. patent application Ser. No. 11/818,187 filed on 12 Jun. 2007, entitled "DUAL ASSESSMENT FOR EARLY COLLISION WARNING," by inventors Daniel H. Greene, Juan Liu, and James E. Reich, U.S. patent application Ser. No. 11/818,122 filed on 12 Jun. 2007, entitled "USING LONG-RANGE DYNAMICS AND MENTAL-STATE MODELS TO ASSESS COLLISION RISK FOR EARLY WARNING," by inventors Juan Liu, Daniel H. Greene, and James E. Reich, U.S patent application Ser. No. 11/818,177 filed on 12 Jun. 2007, entitled "TWO-LEVEL GROUPING OF PRINCIPALS FOR A COLLISION WARNING SYSTEM," by inventors Daniel H. Greene, Juan Liu, and James E. Reich, and U.S. patent application Ser. No. 11/818,176 filed on 12 Jun. 2007, entitled "HUMAN-MACHINE-INTERFACE (HMI) CUSTOMIZATION BASED ON COLLISION ASSESSMENTS," by inventors Daniel H. Greene, Juan Liu, and James E. Reich.

BACKGROUND

1. Field of the Invention

Embodiments of the present invention relate to the design of collision detection and warning systems. More specifically, embodiments of the present invention relate to a method and system for assessing a collision between a primary principal and a non-primary principal for early warning.

2. Related Art

Recent developments in sensing and mobile computing technologies have allowed consumers to benefit from computing in day-to-day applications, which previously has only been available in expensive, stationary systems. One such application is vehicle collision warning. Driver safety can be significantly improved with present-day sensing technologies combined with cost-effective computing power, mobile communication capabilities, and ubiquitous positioning systems. Equipped with these technologies, vehicles can access much better information about the road ahead, and can avoid many more accidents.

To accurately predict collisions and provide effective warning, a collision warning system is often required to process a huge amount of information from different sources. This information overload is further exacerbated as sensors grow more sophisticated and more information about a vehicle's surroundings becomes available. For example, such information may come partly from better sensors in vehicles, partly from intelligent intersections which can track the movements of many principals (e.g., vehicles, pedestrians, and bicyclists), and partly from other principals which carry intelligent devices for tracking and communicating their movements to peer vehicles.

Hence, it is a significant challenge to process this large flow of information in real time and to give accurate and useful warnings of a potential collision.

SUMMARY

One embodiment of the present invention provides a system that facilitates assessment of collision between a primary principal and a non-primary principal for early warning. During operation, the system receives information which indicates a state of the primary principal and a state of the non-primary principal. The system divides future time into a number of time intervals, and estimates a number of possible future states of the primary and non-primary principals, wherein each future state corresponds to a time interval. The system further represents the possible future states of the primary or non-primary principal as one or more geometric objects in a space of which at least one dimension indicates the time. In addition, the system determines a probability of collision between the primary and non-primary principals based on the geometric objects.

In a variation on this embodiment, a geometric object corresponding to a future state of a principal is a 3D object and indicates a location where the principal may be at a given time interval. A projection of the geometric object on the X-Y plane indicates the location of the principal. The Z-position of the geometric object indicates the future time at which the principal is within the location corresponding to the geometric object.

In a variation on this embodiment, a geometric object comprises a bounding box that covers possible future locations of a principal at one or more future times.

In a variation on this embodiment, a geometric object comprises a prismatoid. The bottom of the prismatoid corresponds to the possible location of the primary or non-primary principal at the beginning of a time interval. The top of the prismatoid corresponds to the possible location of the primary or non-primary principal at the end of the time interval.

In a variation on this embodiment, determining the probability of collision between the primary and non-primary principals comprises determining an overlap between two geometric objects which correspond to the primary and non-primary principals respectively and which correspond to the same time interval.

In a variation on this embodiment, determining the probability of collision between the primary and non-primary principals comprises estimating a respective bounding box which encloses the geometric object representing a future state of the primary or non-primary principal. Furthermore, the system determines whether any of the bounding boxes for the primary and non-primary principals intersect.

In a further variation, if two bounding boxes intersect, the system determines whether the geometric objects within the two bonding boxes intersect.

In a further variation, the probability of collision is computed based on the amount of overlap between the bounding boxes In a variation on this embodiment, determining the probability of collision between the primary and non-primary principals involves estimating a respective overall bounding box in the logical 3D space which encloses a plurality of geometric objects representing a plurality of future states of the primary or non-primary principal. Furthermore, the system determines whether the overall bounding boxes for the primary and non-primary principals intersect In a variation on this embodiment, the system determines a time of collision between the primary and non-primary principals.

In a further variation, determining the time of collision involves determining the time when the geometric objects for the primary and non-primary principals first intersect.

In a further variation, the system determines a safe time to warn a user based on the time of collision and at least one of: a user reaction time and a safe time to stop.

In a variation on this embodiment, the system evaluates a collision severity.

In a further variation, the system initializes a probability-based assessment process based on the collision severity.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

Definitions

"Vehicle" as used herein includes any container that is movable either under its own power, power from another vehicle, or human power. It includes, but is not limited to, bicycles, automobiles, trucks, buses, and trailers.

"Principal" as used herein refers to any object that can be a party to a collision. A principal can be moving or stationary. For example, a principal can be a vehicle, a pedestrian, a bicycle, a building, or a light pole. A "primary principal" is the principal of which the user is to be warned. A "non-primary principal" is the principal which is a party to a potential collision and which is not the primary principal. In some embodiments, a principal can also refer to a group of objects, such as a group of pedestrians crossing a street.

A "user" or "user of principal" refers to the individual operating a principal. For example, a user can be a driver of a car where the car is the principal or a person riding a bicycle where the bicycle is the principal. In the case where a principal is a pedestrian, the corresponding user is the pedestrian himself.

Overview

Figure 1:
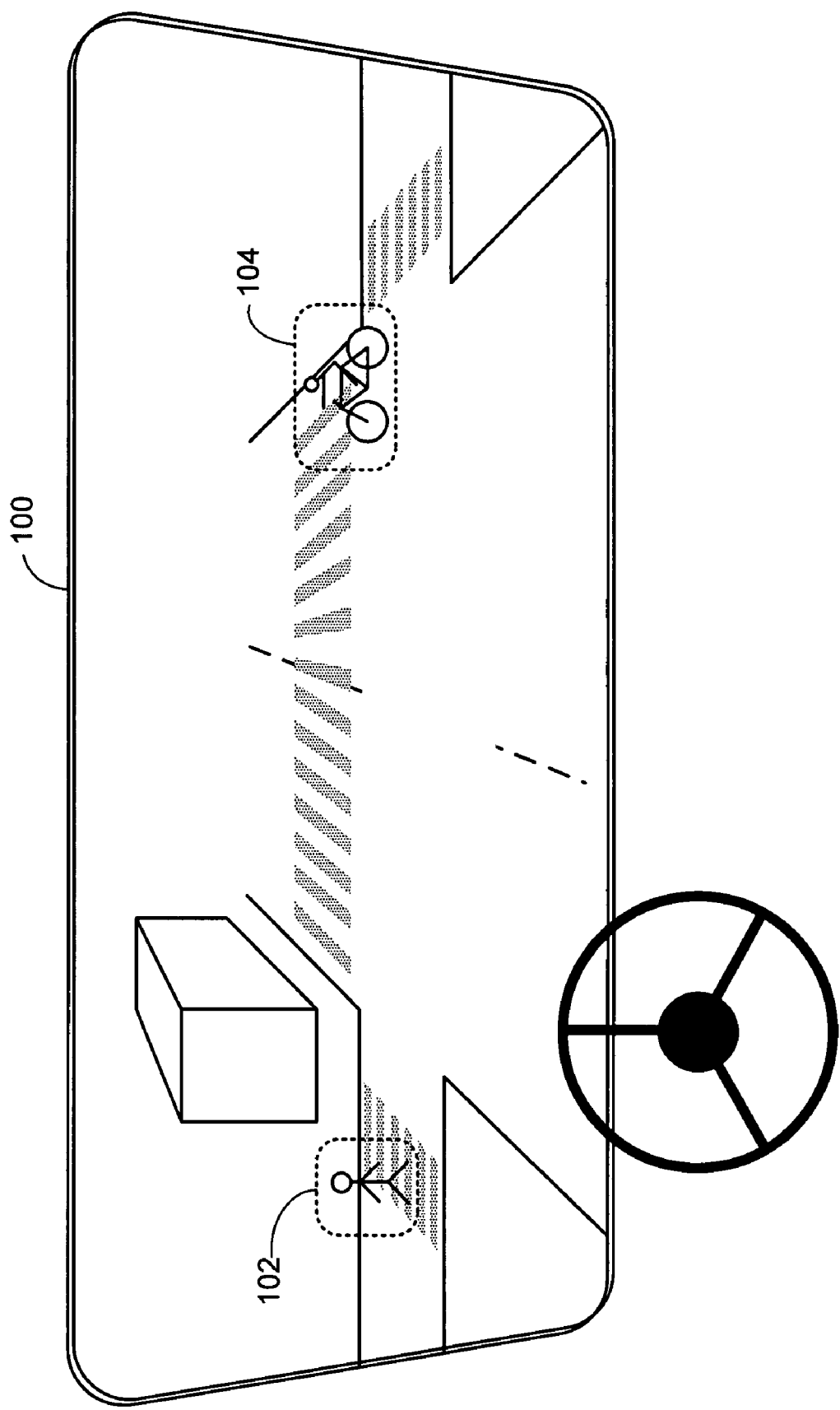
FIG. 1 illustrates an exemplary collision warning system in accordance with one embodiment of the present invention.

FIG. 1 illustrates an exemplary collision warning system in accordance with one embodiment of the present invention. As a user drives his vehicle down the street, he observes through a windshield 100 the intersection the vehicle is approaching. In this example, the vehicle is equipped with a number of sensors that can detect other approaching principals, such as the pedestrian on the left and the bicyclist on the right. In some embodiments, the detection of other principals may be performed by external sensors installed, for example, on fixed locations near the intersection. The sensor data can be broadcast through wireless communication and received by on-vehicle receivers. A collision warning system on the vehicle then processes the received sensor data and issues a warning to the user of potential collisions. In this example, the warning system includes a projection mechanism which can project visual warning images, such as flashing squares 102 and 104 corresponding to the images of the approaching principals, onto windshield 100.

As the vehicle moves along, flashing squares 102 and 104 may appear and then disappear. The issuing of warning signals can depend on the state of the vehicle, such as its location and velocity. The warning system can operate repetitively by processing the sensor data many times per second, thereby providing near-real-time collision warnings. Note that the above example is but one of many possible embodiments of the present invention. Different embodiments may operate with a wide range of warning mechanisms based on, for example, audio and/or visual cues.

In general, a collision warning system includes a data-acquisition mechanism, an information-processing mechanism for processing the data, and a user interface which issues warnings to the user. This disclosure presents a novel architecture, as well as the implementation embodiments, for information processing that occurs after sensor information is received and before the user interface issues warnings. In one embodiment, this information-processing architecture is referred to as the "reasoning layer." This reasoning layer can provide early warnings to users of potential collisions. Such warnings can occur well before the collision and hence can give the user sufficient time to respond and avoid the collision.

As is revealed by numerous accident reports, for a majority of the accidents, at least one of the involved principals generally follows a predictable path. For example, a principal could be making a turn at an intersection or crossing a crosswalk. In general, at least one principal involved in a collision does not perceive the potential collision. For such scenarios, the reasoning layer can apply a priori knowledge of these predictable paths and assess the probability of an accident.

Embodiments of the reasoning layer address several challenges the system faces when processing sensor information and issuing effective warnings. Such challenges include:

Early warning. It is important to warn users early in order to give them sufficient time to react and to apply their own judgment before taking action to avoid accidents.

Accurate warning. While issuing early warnings, the system should also accurately predict the paths of principals to anticipate possible collisions. Ideally, the system should accurately estimate the current movement of principals as well as the likely paths the principals follow.

Effective warning. A system that is looking far enough ahead to warn early will "see" many potential accidents. The system ideally should assess the severity of accidents carefully and only warn about the more critical and imminent accidents. If the system is not selective in issuing warnings, the driver could be distracted or frustrated by frequent warnings.

Customizable warning. To support a diverse range of warning delivery mechanisms (e.g., audio, in-dash, heads-up, and roadside signage), a versatile, inter-operable warning system should support customization based on different user interfaces. The system ideally takes into account the risks of distraction and limitations on warning frequency associated with these interfaces.

In embodiments of the present inventive architecture, the reasoning layer resides in principals. A principal's reasoning layer can receive information from the vehicle itself, from sensors in other principals, and/or from the infrastructure of an intersection. For the sake of clarity, the reasoning layer described herein is assumed to be in a vehicle, even though it is also possible that pedestrians or bicyclists can carry devices with a reasoning layer. Likewise, the infrastructure capabilities are assumed to reside near intersections, although such capabilities could also be deployed between intersections, especially where accidents are common.

The present inventive collision-warning architecture can benefit significantly from future intelligent intersections. It is expected that these intersections will be able to broadcast their geometry and coordinates of any principals that they are able to track. These capabilities are likely to be characterized and standardized, which are important considerations for communally shared and funded technology. On the other hand, it can be foreseen that the more complex reasoning can be located closer to the individual consumer, that is, in vehicles or portable devices.

In further embodiments, the reasoning layer can function autonomously, independent of the infrastructure, with on-board databases and on-board sensing if necessary. Such an autonomous reasoning layer allows for deployment of a functional warning system ahead of the development of intelligent infrastructure and ahead of the emergence of a critical mass of other principals capable of communicating their tracking information.

In this disclosure, it is assumed that the reasoning layer has access to information about the location and trajectory of the primary and non-primary principals. In particular, it is assumed that the basic sensing, data fusion, and data association problems are already addressed before the reasoning layer is applied. For example, on-board global positioning systems (GPSs) are assumed to have resolved pseudo-ranging and performed differential improvements or temporal filtering as appropriate. Alternatively, or additionally, intersections are assumed to have fused their video and/or light detection and ranging (LIDAR) sensor signals into single tracks associated with specific principals. As is disclosed in later sections, the reasoning layer can adopt technologies, such as Kalman filtering and particle filtering, that are also able to manage low quality sensor data competently. In general, it is assumed that there is a lower level "sensing layer" that provides reasonably accurate, albeit noisy, tracking information about principals.

The reasoning layer can inter-operate with various designs of in-vehicle user interfaces for warning delivery. Ideally, an early warning system should be able to issue easily understood emergency alerts with minimal distraction, e.g., in the periphery of head-up displays or with directional sound. Embodiments of the present invention allow the reasoning layer to interface with a wide variety of user interfaces for warning delivery. In particular, the accident assessments produced by the reasoning layer can include information necessary for the warning-delivery mechanism to make critical decisions on if, when, and how to issue warnings. Moreover, it is possible to make these decisions in a way that is customized to the characteristics of particular human-machine interfaces (HMIs) and particular users.

Dual-Assessment System

Figure 2A:
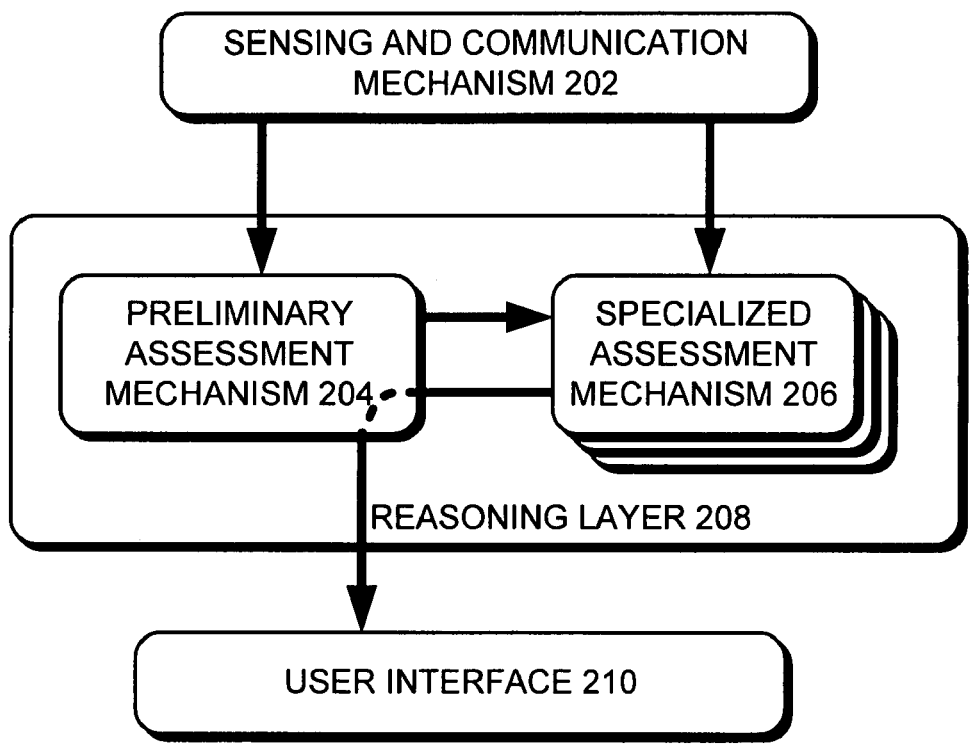
FIG. 2A illustrates an exemplary architecture of a dual-assessment system in accordance with one embodiment of the present invention.

In one embodiment, the reasoning layer is based on a dual-assessment system, which includes a "preliminary assessment" mechanism (also referred to as the "preliminary assessor") and a "specialized assessment" mechanism (also referred to as the "specialized assessor"). FIG. 2A illustrates an exemplary architecture of a dual-assessment system in accordance with one embodiment of the present invention. As illustrated, a sensing and communication mechanism 202 feeds sensor information to a reasoning layer 208, which includes a preliminary assessment mechanism 204 and a specialized assessment mechanism 206. Preliminary assessment mechanism 204 performs a rapid geometric and logical identification of potential accidents, and, when appropriate, instantiates one or more specialized assessment mechanisms 206 to perform more detailed, statistical analysis of potential accidents. Specialized assessment mechanism 206 then returns the assessment results to preliminary assessment mechanism 204, which forwards these results to a user interface 210. User interface 210 then determines if, when, and how to issue the corresponding warnings.

This dual-assessment approach effectively solves three critical problems in accident assessment:

- The complexity of analyzing the large number of activities that might cause accidents. The geometric approach of the preliminary assessor is highly optimized for covering large numbers of principals and collision scenarios.
- Managing computational resources. By first computing preliminary assessments for a wide range of collision scenarios, the reasoning layer can estimate the likelihood or severity of potential accidents and allocate resources to the most dangerous or likely scenarios, in the form of more computationally-demanding specialized assessors.
- Model selection. In general, the accuracy of statistical analysis of a potential accident depends on the quality of models for the behavior of the principals. Fortunately, a large percentage of principals follow predictable patterns. The preliminary assessor can sort through these patterns and select the appropriate models for the specialized assessors.

Figure 2B:
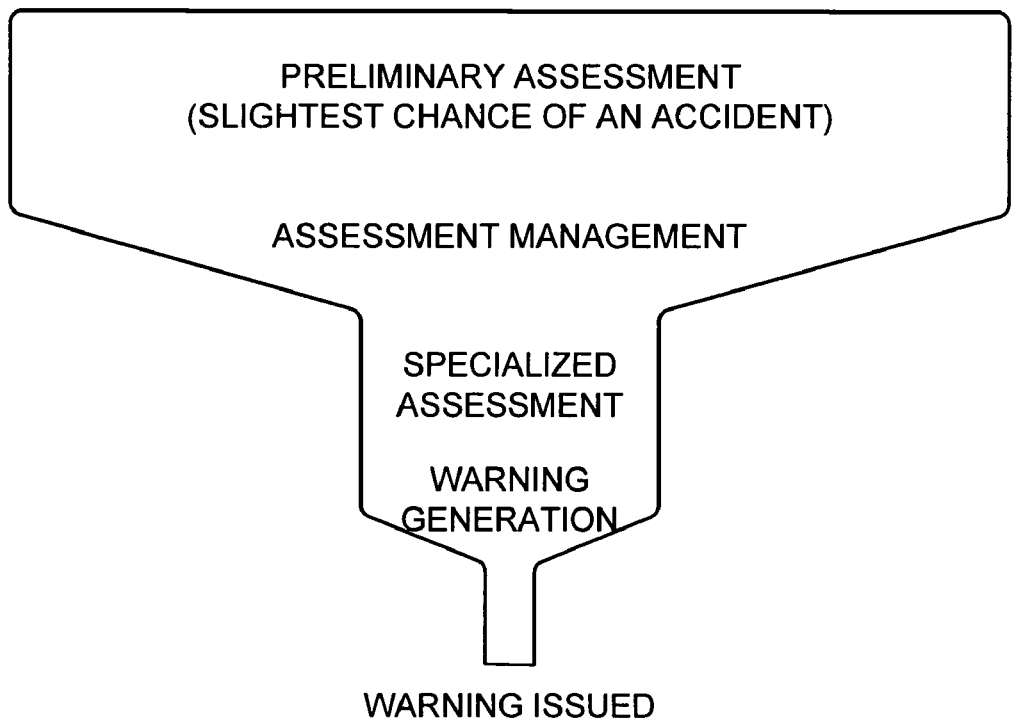
FIG. 2B presents a logical architecture of the reasoning layer in accordance with one embodiment of the present invention.

FIG. 2B presents a logical architecture of the reasoning layer in accordance with one embodiment of the present invention. As the unprocessed sensor data enters the reasoning layer from the top, the preliminary assessor detects the slightest chance of an accident. Based on the preliminary assessment results, the preliminary assessor performs the assessment management by ordering and selecting collision scenarios which deserve to be analyzed further.

Subsequently, the preliminary assessor feeds the selected sensor data and appropriate collision scenario with the corresponding models to a specialized assessor. The specialized assessor then performs more accurate statistical computations to predict details of a potential collision, and returns such details to the preliminary assessor. The predicted collision details are passed to the warning generation system, which determines which collision scenarios warrant the issuance of warnings and schedules these warnings accordingly.

In one embodiment, the reasoning layer can be viewed as an information screening mechanism that filters through a large amount of real-time sensor data and determines the most effective way to warn a user of potential collisions. This information screening mechanism is particularly useful when the primary principal is continuously receiving sensor information, a majority of which may not pertain to potential collisions.

Figure 3:
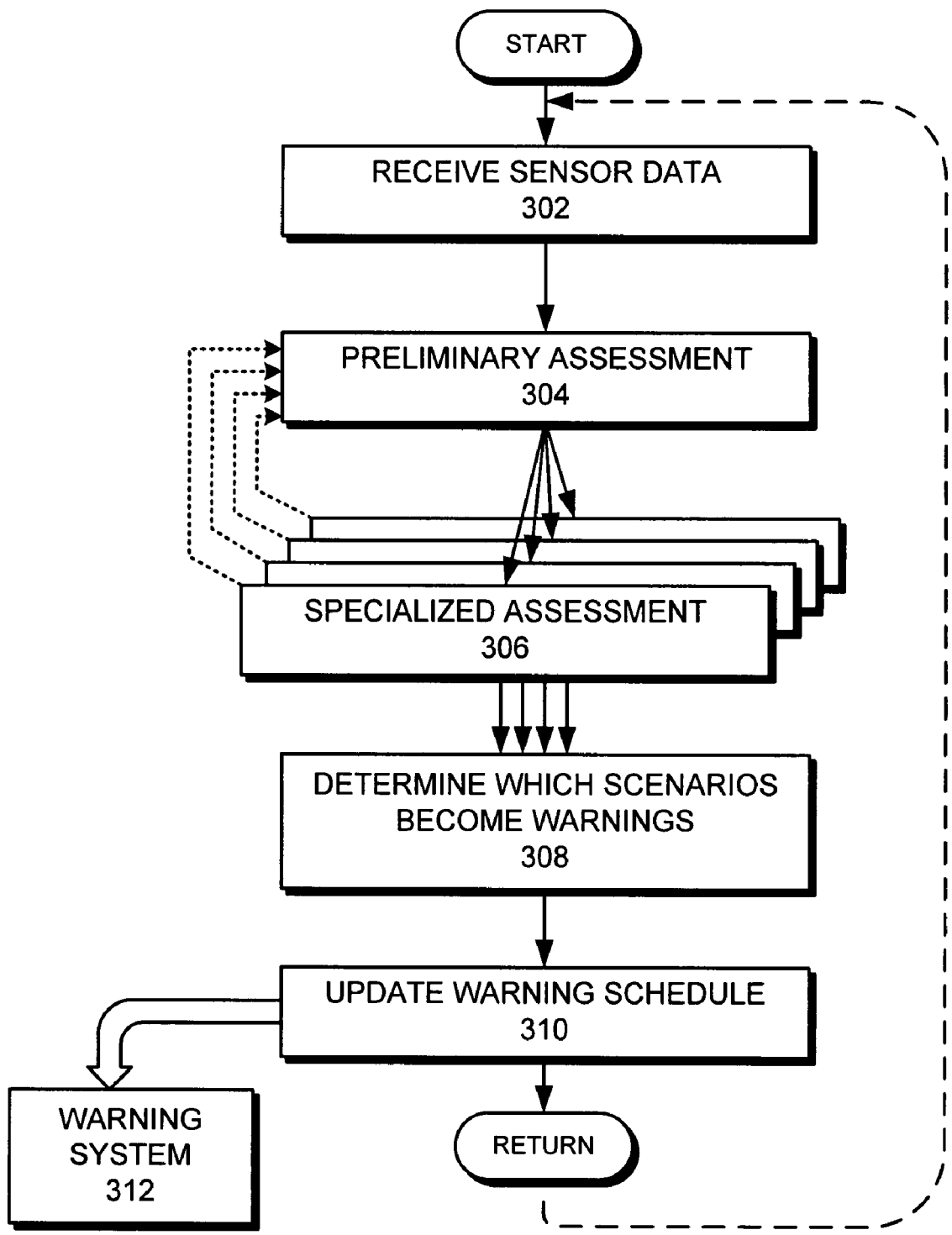
FIG. 3 presents a flowchart illustrating an exemplary operation of the reasoning layer in accordance with one embodiment of the present invention.

FIG. 3 presents a flowchart illustrating an exemplary operation of the reasoning layer in accordance with one embodiment of the present invention. During operation, the system receives sensor data from the underlying sensing and communication mechanism (operation 302). Subsequently, the system performs preliminary assessment on the received sensor data (operation 304). Based on the number of detected collision scenarios, the preliminary assessor then instantiates a number of specialized assessors to perform more accurate analysis of the collision scenarios (operation 306). Note that preliminary assessment and specialized assessment can be performed repetitively at a high frequency to facilitate constant updating of the collision prediction. This way, the system can provide near-real-time assessment of potential collisions.

The results of the preliminary assessment are then fed to a user interface, or HMI, which determines which collision scenarios become warnings (operation 308). The HMI further updates the warning schedule and issues warning commands according to the schedule to a warning system 312 (operation 310). Note that, in one embodiment, the system performs operations 308 and 310 at the same frequency as the specialized assessment. That is, the warning schedule is updated in near-real time based on the assessment results provided by the specialized assessment.

The aforementioned dual-assessment system can be implemented in software, hardware, or a combination of both. In addition, this system can be operated on a real-time operating system.

Preliminary Assessment

In one embodiment, the preliminary assessment uses a library of likely trajectories for principals and applies efficient geometric tests to determine whether two principals might collide.

Motion of Principals

In one embodiment, the system decomposes the motion of a principal into a "trajectory" in the X-Y plane, and a "dynamics" along the trajectory. This decomposition is based on the observation that principals usually follow predictable trajectories. For example, the curves followed by right turning vehicles in an intersection are often similar, but vehicle speed and acceleration along these trajectories can vary significantly. That is, some vehicles might turn at high speeds while other turn at low speeds. Based on this observation, the motion of a principal can be described by a corresponding trajectory and dynamics. More formally, let a trajectory, T(s), be a vector valued, $R \rightarrow R^2$ function from the principal's displacement along the trajectory, s, to the physical X-Y plane, wherein T(s) is arc-length parameterized:

$$\left\| \frac{\partial T(s)}{\partial s} \right\| = 1.$$

In other words, changing s by one unit will trace out a unit length path in the plane. In one embodiment, T can be a piecewise function of line segments and arc segments.

Figure 4:
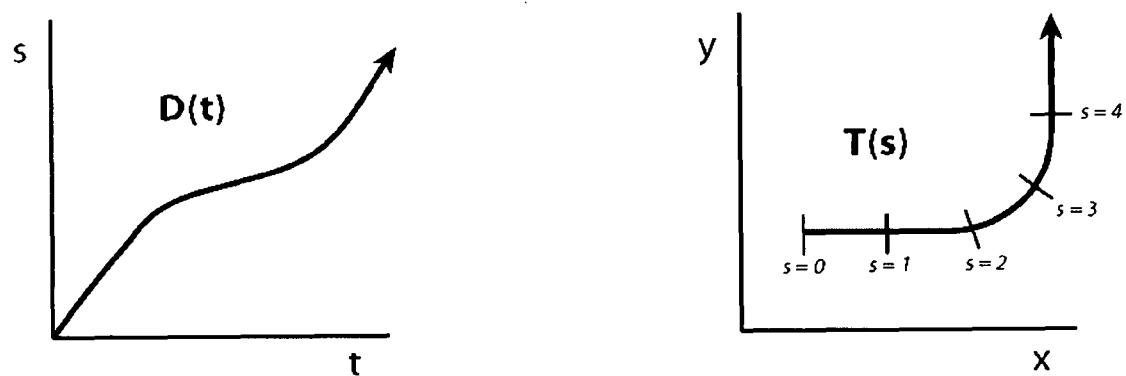
FIG. 4 illustrates an example of a dynamics and a trajectory function corresponding to a principal making a left turn in accordance with one embodiment of the present invention.

A dynamics is described as a function s=D(t) from $R \rightarrow R$, which indicates displacement along the trajectory as a function of time. In one embodiment, D can be a piecewise function of periods of steady speed (i.e., expressed as at+b) and accelerations or decelerations (i.e., expressed as $at^2+bt+c$). A motion can be described as a composition of a trajectory and a dynamics: T(D(t)). In other words, a dynamics describes the motion of a principal along a straight line, and a trajectory distorts this motion to follow a more realistic path in the plane. FIG. 4 illustrates an example of a dynamics and a trajectory function corresponding to a principal making a left turn in accordance with one embodiment of the present invention.

In one embodiment, the preliminary assessor uses the aforementioned motion model to describe the motion of the primary principal and one or more non-primary principals in a specific collision scenario. Furthermore, these motion models can be passed to the specialized assessor for statistical analysis of the collision scenario. Note that other methods of motion decomposition and modeling can also be employed by the present invention.

Segmented Cones

In one embodiment, the preliminary assessment adopts a geometric approach, referred to as "segmented cones," to predict future movements and positions of a principal, thereby facilitating assessment of potential collisions. Segmented cones can be used to predict worst-case scenarios of where principals might travel. More formally, a segmented cone is a region defined in a three dimensional space (x, y, t), where the Z-axis indicates time. Note that in the description herein the position of a principal is determined by a set of 2-D coordinates (x, y), since most collisions occur within the same plane which is the road surface.

Figure 5:
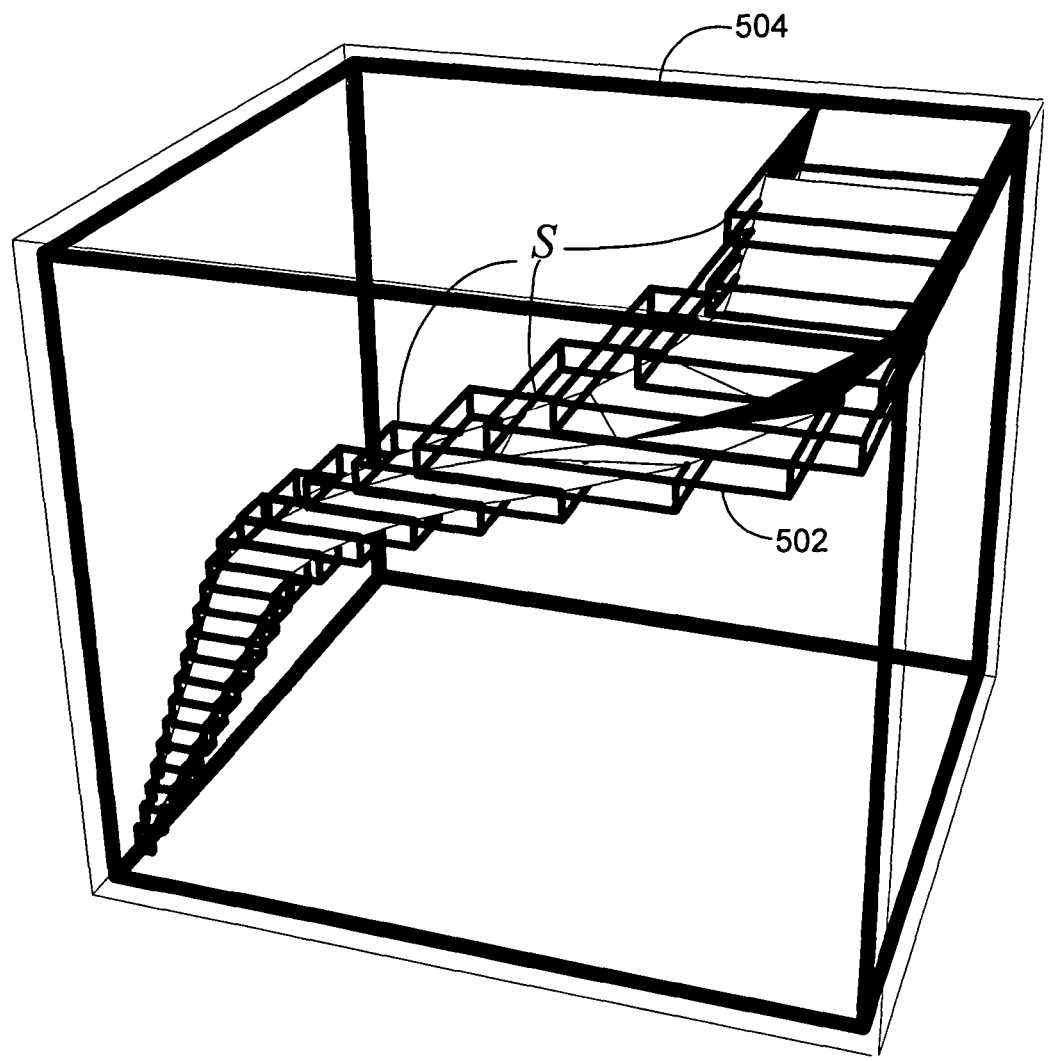
FIG. 5 illustrates an exemplary segmented cone for a principal in accordance with one embodiment of the present invention.

FIG. 5 illustrates an exemplary segmented cone for a principal in accordance with one embodiment of the present invention. A segmented cone covers most of the likely future locations of a principal in a particular scenario. For example, if the scenario is "vehicle makes a right turn," then a segmented cone for that scenario describes a region $S \in R^3$. If the vehicle does make a right turn, then with high probability the vehicle's future location, represented by a point (x, y, t), is inside S. The further into the future the system predicts (i.e., the further up along the Z-axis), the more difficult it becomes to predict accurately where a principal will be located. Hence, the segmented cone will flare with increasing t, which results in the inverted cone appearance as illustrated in FIG. 5.

Region S is referred to as a "segmented" cone because it is formed by prismatoids joined together at a set of t values: $t_0, t_1, t_2, t_3, \ldots$. A prismatoid i represents the likely locations of a principal during a future time interval $(t_i, t_{i+1})$. The t coordinate of the bottom plane of the prismatoid corresponds to $t_i$, and the t coordinate of the top plane corresponds to $t_{i+}$. The projection of the bottom plane on the X-Y plane corresponds to the likely location of the principal at time $t_i$. Likewise, the projection of the top plane corresponds to the likely location of the principal at time $t_{i+1}$.

Note that although the disclosure above teaches using prismatoids to represent future states of a principal, in general, any geometric objects can be used to indicate the future location of the principal at a future time. For example, a future state can be represented as a cylindrical object.

Figure 6:
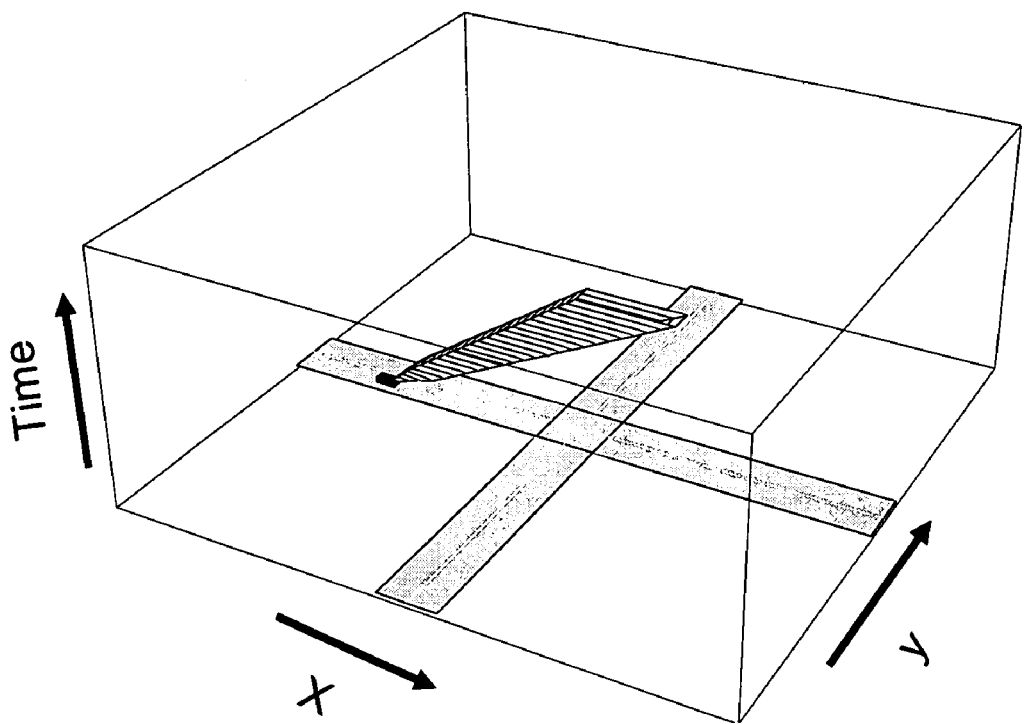
FIG. 6 illustrates a segmented cone representing the future states of a principal that is likely to move along a straight line with a constant velocity in accordance with one embodiment of the present invention.
Figure 7:
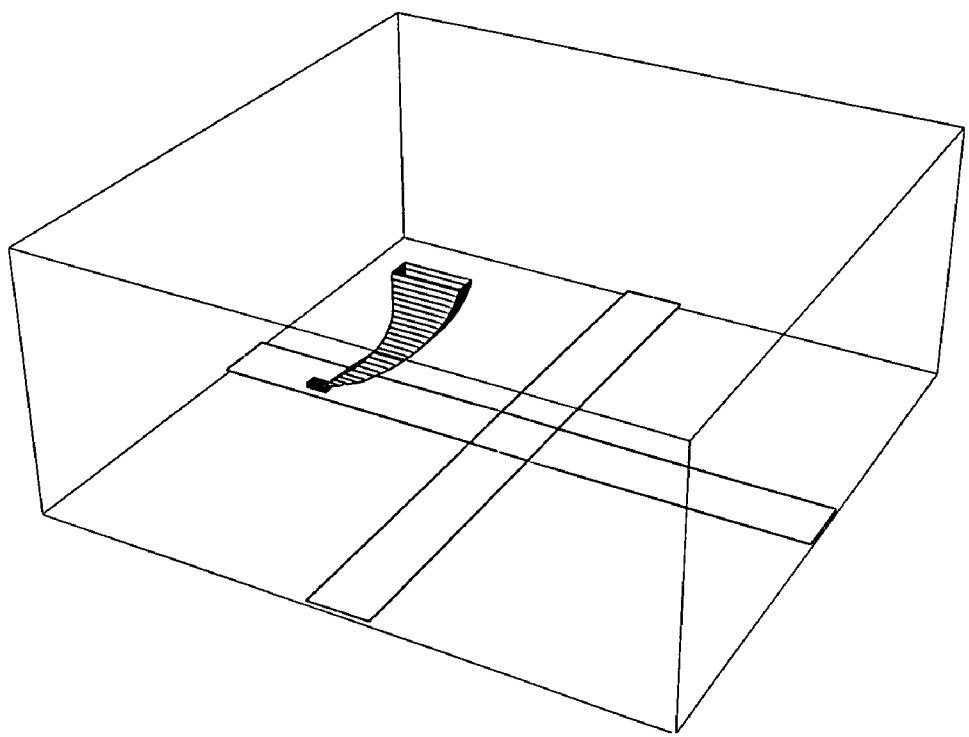
FIG. 7 illustrates a segmented cone representing the future states of a principal that is likely to stop in accordance with one embodiment of the present invention.
Figure 8:
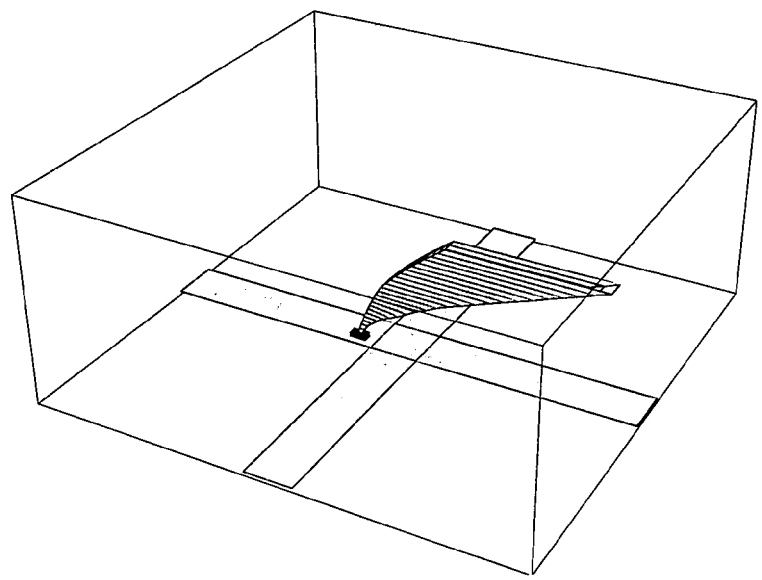
FIG. 8 illustrates a segmented cone representing the future states of a principal that is likely to accelerate along a straight line in accordance with one embodiment of the present invention.

A number of exemplary segmented cones representing different motions are illustrated in FIGS. 6-8. FIG. 6 illustrates a segmented cone representing the future states of a principal that is likely to move along a straight line with a constant velocity. FIG. 7 illustrates a segmented cone representing the future states of a principal that is likely to stop. FIG. 8 illustrates a segmented cone representing the future states of a principal that is likely to accelerate along a straight line.

For each prismatoid there is a bounding box, such as bounding box 502. There is also an "overall" bounding box 504 for the entire segmented cone. These bounding boxes form the basis for efficient computation of cone intersection. In one embodiment, if the overall bounding boxes of two cones do not intersect, then the corresponding cones do not intersect. Otherwise, the individual prismatoid bounding boxes of two cones can be compared pair-wise at corresponding time intervals, since all segmented cones can share the same segmentation: $t_0, t_1, t_2, t_3, \ldots$. Note that the time segmentation, or slicing, can be uniform or non-uniform. Furthermore, although the bounding boxes shown in this example are cuboids, geometric objects with other shapes can also be adopted to function as bounding boxes.

If two prismatoid bounding boxes belonging to two cones intersect, the system assumes, conservatively, that the cones intersect. The system can optionally further compare the prismatoids for intersection. However, this further testing might not be necessary because the subsequent specialized assessment can provide more accurate assessments. Note that the aforementioned hierarchical bounding-box comparison allows fast preliminary assessments in a near-real-time fashion without consuming a large amount of computing power.

Figure 9:
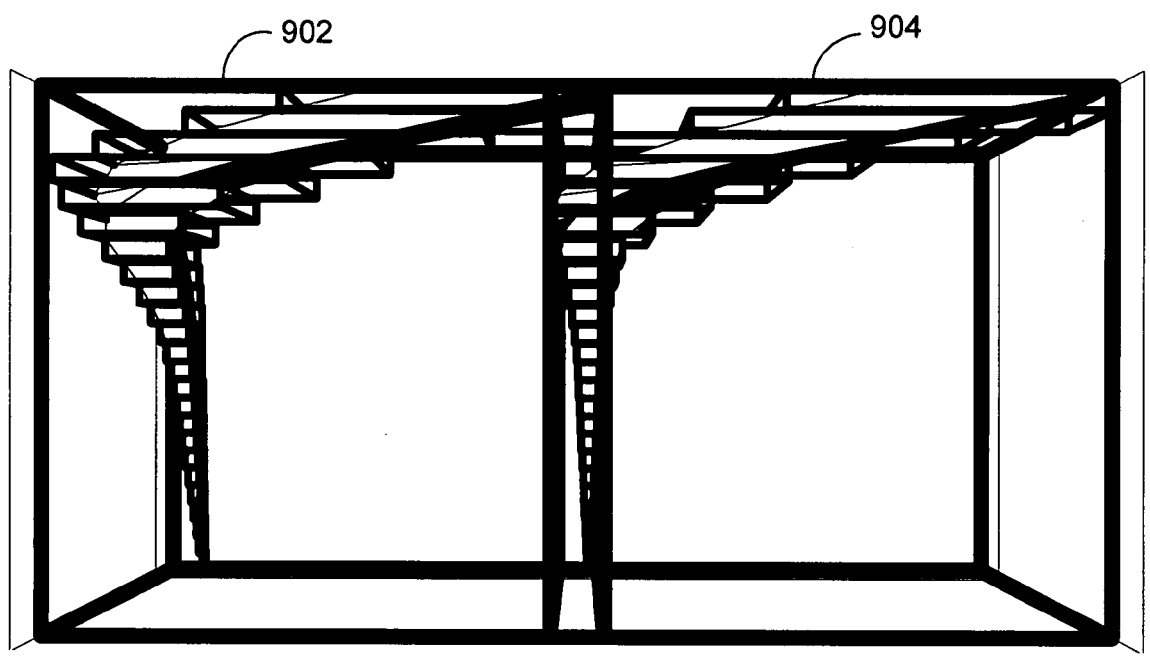
FIG. 9 illustrates an exemplary comparison of two segmented cones in accordance with one embodiment of the present invention.

FIG. 9 illustrates an exemplary comparison of two segmented cones in accordance with one embodiment of the present invention. The system first compares two overall bounding boxes 902 and 904, and determines that bounding boxes 902 and 904 intersect. The system subsequently compares the corresponding prismatoid bounding boxes of the two cones. Since the pair-wise comparison does not result in any intersections, the system determines that the two segmented cones do not intersect, and that the two principals will not collide.

Segmented Cone Generation

A segmented cone represents a worst-case projection of where a principal might be, assuming that the principal follows a particular scenario. The generation of cones is based on the context of the principal. This context suggests which scenarios are likely. The system then generates cones for the likely scenarios (sometimes more than one per principal).

In one embodiment, the context is expressed as a logical conjunction of trigger conditions. For example, when a vehicle is near the center of a left turn lane, and within 40 meters of an intersection, a left-turning cone is generated. In general, a trigger condition can include a number of predicates based on a variety of information, including the principal's state, a user's behavioral pattern, and the information surrounding an intersection. For example, a trigger condition may depend on the state of a traffic light, or on the presence of other vehicles blocking the principal's path.

Once segmented-cone generation is triggered, a cone is created by combining a priori information for the scenario with a current state of the principal to project a cone forward in time. Note that a state of the principal can include the location and velocity of the principal. In one embodiment, there are several basic cone generators that are shared by the library of scenarios. Each of the cone generators follows a different procedure for combining the a priori information from the scenario with the current state.

Figure 10:
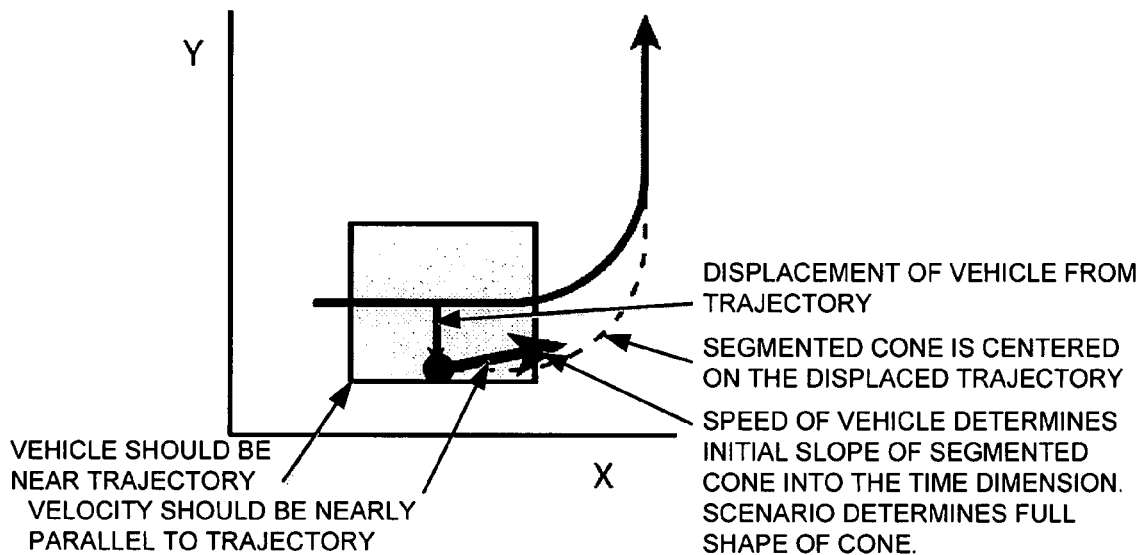
FIG. 10 illustrates the generation of a segmented cone in accordance with one embodiment of the present invention.

FIG. 10 illustrates the generation of a segmented cone in accordance with one embodiment of the present invention. In this case, the a priori information is the trajectory in a left-turn scenario. The current state of the principal includes the principal's location and velocity. The cone generation is triggered when the principal is near the trajectory and traveling in almost the same direction as the trajectory. The current state of the principal further includes a displacement vector from the trajectory and a speed. The centerline of the cone is then formed by applying the displacement to the entire trajectory, and by creating a dynamics that follows the displacement at the current speed of the principal.

Figure 11:
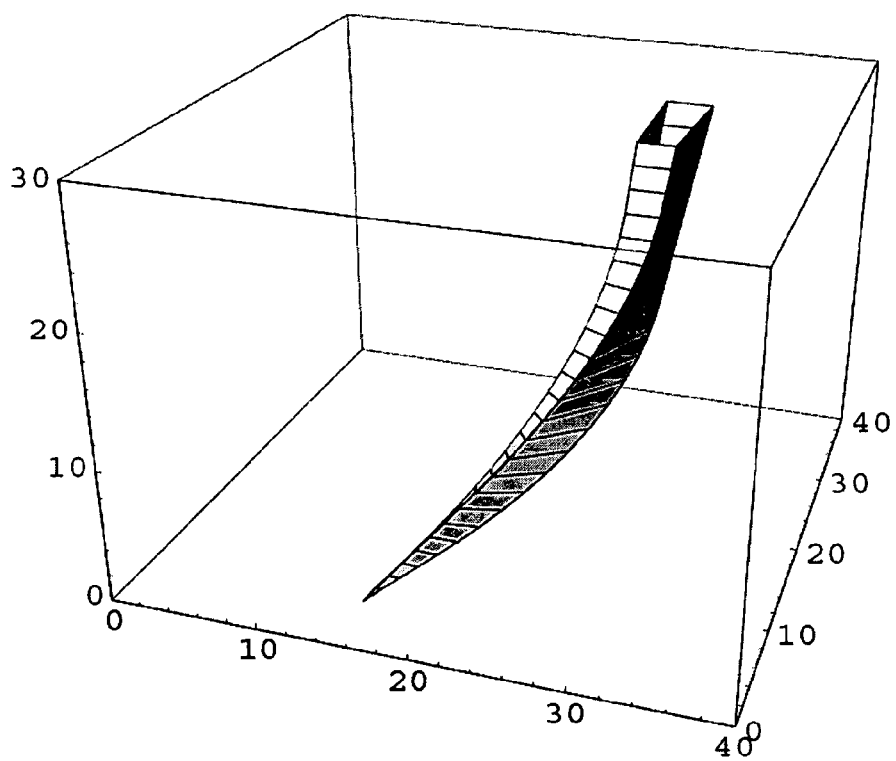
FIG. 11 illustrates an exemplary segmented cone that corresponds to the trajectory in FIG. 10 in accordance with one embodiment of the present invention.

In one embodiment, uncertainty along the trajectory is captured by allowing the dynamics to speed up or slow down by a modest percentage (which is also part of the a priori information). Uncertainty perpendicular to the trajectory (e.g., lane position) is included by allowing a "flare" function that depends on the distance that the principal has traveled along the trajectory. FIG. 11 illustrates an exemplary segmented cone that corresponds to the trajectory in FIG. 10 in accordance with one embodiment of the present invention.

By combining the a priori information with the current state of a principal, the preliminary assessor can adapt better to the actual behavior of principals. For example, a slow-moving pedestrian will generate a different cone and will thereby be treated more carefully by the preliminary assessor.

In one embodiment, the system can further take into consideration certain "erratic" behavior patterns, in which the trajectory of the principal is not very predictable. These erratic scenarios would include such behaviors as a driver turning in the wrong direction on a one-way street, or a driver falling asleep and drifting into oncoming traffic. In such cases the cone generators can create heavily flared cones that reflect the lack of "good" a priori information.

Figure 12:
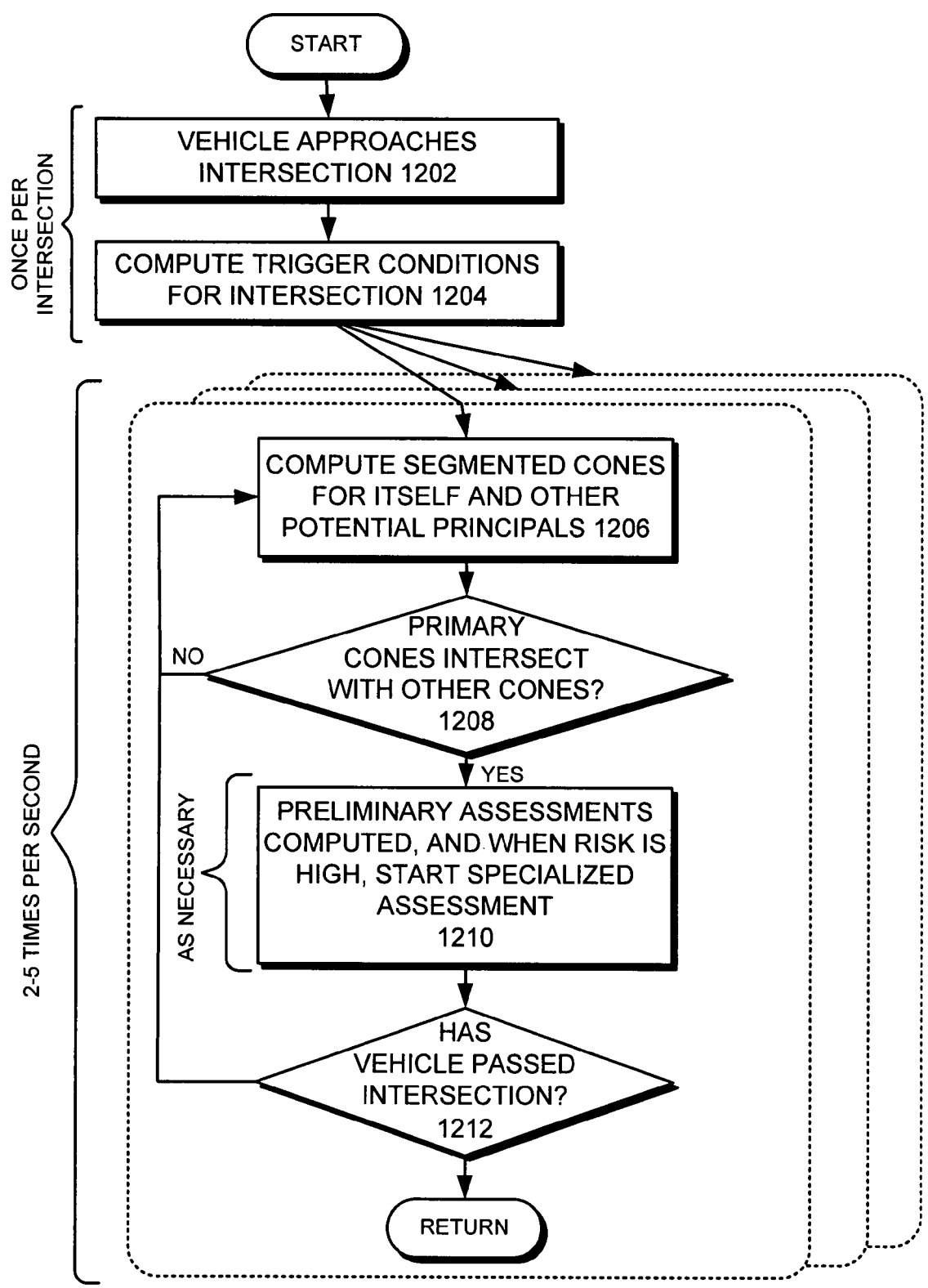
FIG. 12 presents a flowchart illustrating an exemplary operation of a preliminary assessor in accordance with an embodiment of the present invention.

FIG. 12 presents a flowchart illustrating an exemplary operation of a preliminary assessor in accordance with an embodiment of the present invention. A vehicle first approaches an intersection (or other region for which early warning is useful) (step 1202). As the vehicle is approaching the intersection, the preliminary assessor computes trigger conditions for the intersection (operation 1204). Note that these trigger conditions need to be computed only once for the intersection, and they can be reused repeatedly as the vehicle travels through the intersection. Typically, the trigger conditions depend on the geometry of the intersection and the library of scenarios that will be tracked for early warning. For example, if the intersection contains crosswalks, there will be trigger conditions that can cause segmented cones to be generated when pedestrians enter those crosswalks. The geometry of the intersection should be available for this initial trigger formation.

Note that the intersection may communicate its geometry to approaching vehicles using some form of communication protocol. However, a preliminary assessor can also obtain intersection geometry from other sources, such as pre-loaded databases, or from learning the geometry adaptively for intersections traversed in the past.

The amount of intersection geometry information might not be large. It can be similar in size and complexity to the encoding of intersections used in traffic simulators. For example, the geometry information can include the centerline geometry of the roads, the number of lanes, their width, their turning rules, and the timing of the traffic lights. It would be possible to compactly encode this information into an on-board database.

Once the trigger conditions are computed, the system enters a high frequency loop (on the order of 2-5 times per second), where the current location and velocity of all principals (vehicles, pedestrians, and bicyclists) near the intersection are compared with all the pre-computed trigger conditions, and when the conditions of triggers are true, segmented cones are generated (operation 1206). This may result in one or more segmented cones being generated for each principal.

Next, the system determines whether the primary cones intersect with any other cones (operation 1208). If the system does not detect any intersection, the system continues the loop as the vehicle progresses along its trajectory. If an intersection is detected and the preliminary assessed collision risk is sufficiently high, the system triggers the specialized assessment (operation 1210). The system further determines whether the vehicle has passed the intersection (operation 1212). If so, the system returns to the normal state and waits for the vehicle to enter into another intersection or a location that requires computation of another set of trigger conditions. Otherwise, the system continues the loop.

Figure 13A:
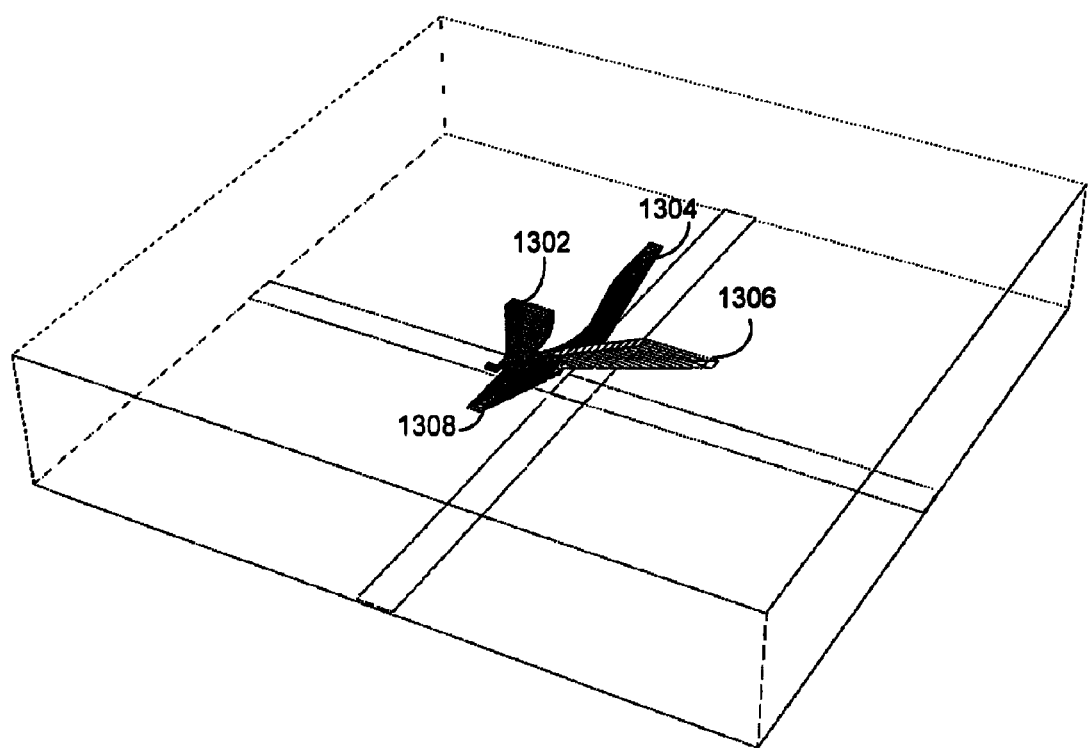
FIG. 13A illustrates the generation of multiple primary segmented cones in accordance with one embodiment of the present invention.

FIG. 13A illustrates the generation of multiple primary segmented cones in accordance with one embodiment of the present invention. As a principal approaches an intersection, the on-board collision warning system triggers four possible scenarios for the vehicle movement and generates four corresponding cones 1302, 1304, 1306, and 1308. Cone 1302 represents a stop scenario, cone 1304 represents a left-turn scenario, cone 1306 represents a go-forward scenario, and cone 1308 represents a right-turn scenario.

Figure 13B:
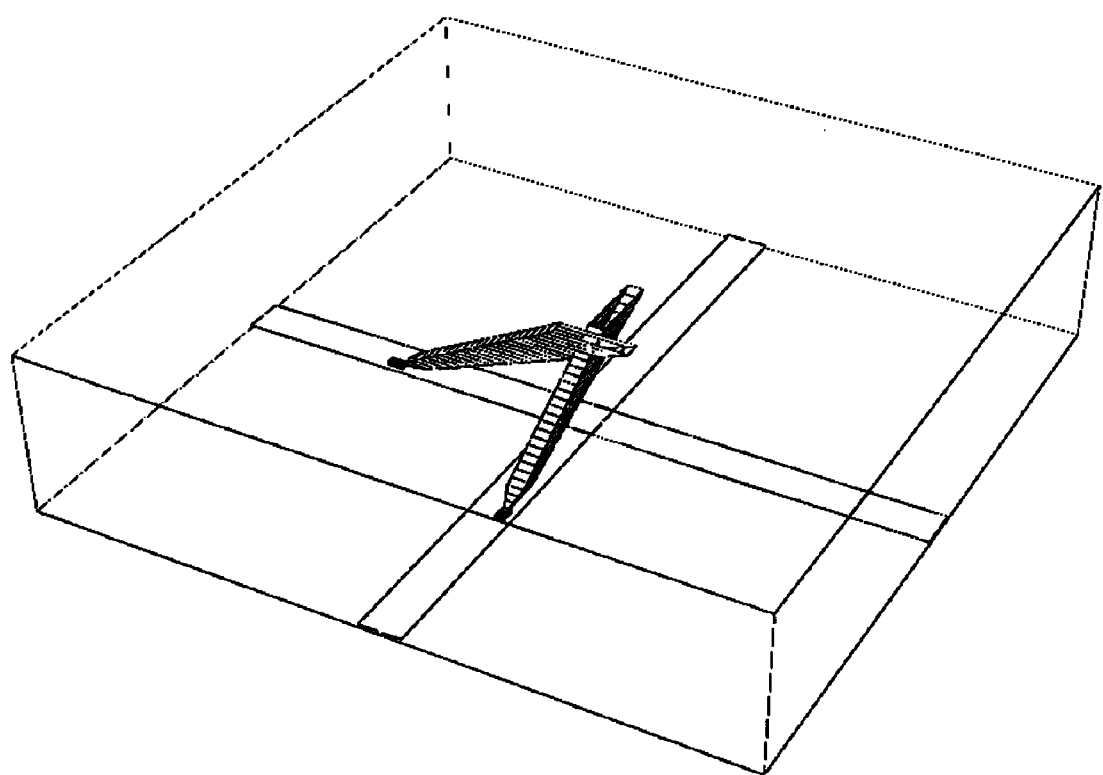
FIG. 13B illustrates an exemplary intersection of the segmented cones of two vehicles in accordance with one embodiment of the present invention.

FIG. 13B illustrates an exemplary intersection of the segmented cones of two vehicles in accordance with one embodiment of the present invention. This intersection can trigger a preliminary assessment of the collision risk in the intersection. The system then uses the preliminary assessments to determine which scenarios deserve specialized assessment and, correspondingly, additional computational resources are allocated to the most likely and most serious scenarios.

Finally, once all the scenarios are assessed, the assessment results are delivered to the user interface(s), which decide if, when, and how to warn the user. Since cone generation and testing can be quite efficient, it is expected that preliminary assessment, including generation of cones and testing cone intersections, can run 2-5 times per second, depending on the processing power available to the primary principal.

In one embodiment, the period of time covered by one cycle of preliminary assessment is referred to as a "time slice." Once specialized assessment is initiated for a scenario, and the scenario proves to be sufficiently serious, the tracking algorithms used in specialized assessment will be run over multiple subsequent time slices.

Computation of Preliminary Assessment

When two segmented cones intersect, a potential collision is detected. Because this preliminary determination is based on large, worst-case sized cones, the predicted collision may still be unlikely. Although specialized assessment can compute a more accurate collision probability and an expected utility of the warning which can help determine if warnings are warranted, it is useful to estimate a probability, time, and location for the collision during preliminary assessment, because of the following reasons:

The preliminary assessment provides a basis to determine which scenarios deserve specialized assessment, and to allocate resources to specialized assessment.

When it is not possible to allocate resources to all scenarios, the preliminary assessment will provide an inexpensive alternative to specialized assessment.

Some scenarios involve erratic behavior that does not have a model, or the accuracy of the model cannot be improved by specialized assessment. Preliminary assessment would be sufficient.

In one embodiment, the system takes a "factored" approach to preliminary assessment. Each principal is assumed to be following one or more individual scenarios, such as "vehicle turns left" or "pedestrian leaves curb to cross street." That is, the preliminary assessor uses its triggers to look for individual scenarios, not for combined scenarios such as "left turning vehicle hits pedestrian leaving the curb." This approach has the advantage that many more combined scenarios can be tracked based on fewer individual scenarios. In one embodiment, preliminary assessments are computed from combinations based on the properties of cone intersections.

Figure 14:
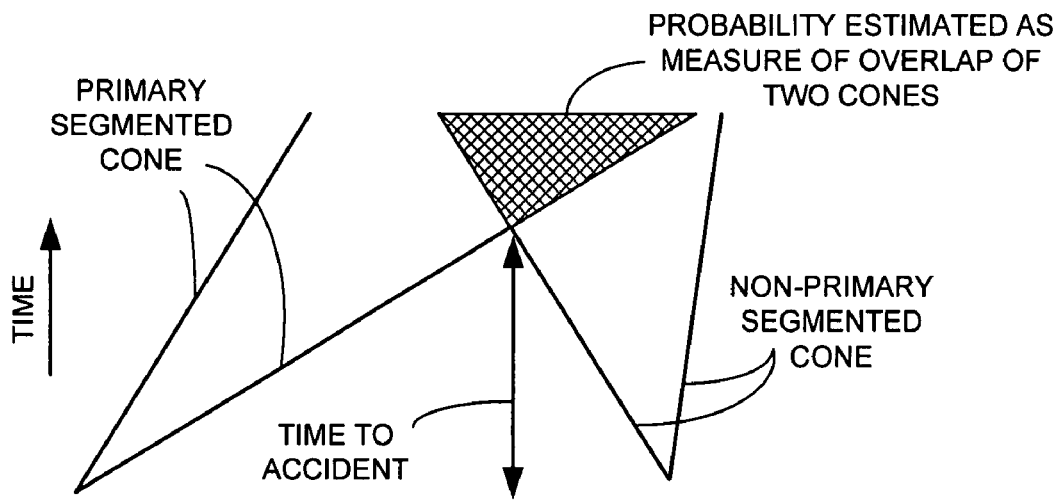
FIG. 14 illustrates how a preliminary assessment is computed from a segmented cone intersection in accordance with one embodiment of the present invention.

FIG. 14 illustrates how a preliminary assessment is computed from a segmented cone intersection in accordance with one embodiment of the present invention. The time to accident is conservatively assumed to be the point where the cones first intersect. The system computes the probability of collision considering each of the overlapping prismatoids separately, tier by tier, estimating the probability based on the amount of overlap, and then using the highest probability among the overlapping tiers. For two overlapping tiers, the probability is estimated as:

$$P(s_i, s_j) = p_{s_i} p_{s_j} \left(\frac{o}{a_i}\right)\left(\frac{o}{a_j}\right), \quad (1)$$

where $s_i$, and $s_j$ denote the two scenarios that cause the two cones to be generated, $a_i$ and $a_j$ are the X-Y areas of the two prismatoid bounding boxes, and o is the X-Y area of the overlap of these two bounding boxes. Equation (1) also takes into account the prior probabilities for the two individual scenarios, $p_{s_i}$ and $p_{s_j}$ which are fixed probabilities stored in the scenario library as part of the a priori information.

The above heuristics based on segmented-cone intersection can be computed very efficiently. However, they do not include a measure of the severity of potential accidents and the lead time needed to warn the driver. Such information can facilitate computation of an expected utility for deciding whether to warn the driver. In other words, it is desirable to obtain the product of the collision probability with the benefit of warning. To estimate the severity of collision during preliminary assessment, each of the two individual scenarios provides an initial assessment of their principal's kinetic energy and vulnerability. In one embodiment, vulnerability is measured by a value between 0 and 1, and is assigned a value of 1 for pedestrians and bicyclists based on the assumption that passengers in vehicles are better protected. Then the two initial values are combined using an empirical formula to produce a severity value S between 0 and 10. In one embodiment, the empirical severity formula is chose such that its value converges quickly to its highest value of 10 when there is any significant amount of energy involved in the potential collision.

A warning deadline is computed based on the predicted accident time minus a lead time based on driver reaction and a safe stopping distance or safe stopping time for the primary principal. The predicted accident time can be computed as the time of the first intersection of two prismatoids representing future states of the primary and non-primary principals. In one embodiment, the benefit of warning is assumed to be equal to the severity value, until the warning deadline is reached.

Once the preliminary assessment is completed, the product of the collision probability and the severity, $P(s_i, s_j) \cdot S(s_i, s_j)$, gives an estimated utility of issuing a warning, which can be used to rank the potential accidents for consideration of specialized assessment and possible warning.

Management of Resources

Preliminary assessments provide a basis for resource allocation for specialized assessment. In general, the possible approaches to specialized assessment provide a trade-off between amount of computation used and the accuracy of results achieved. In one embodiment, the reasoning layer includes a mechanism for different specialized assessor algorithms, $A_k$, to register with the preliminary assessor according to which scenarios they handle, and to provide estimates of their respective computational cost and expected accuracy. In some cases, the same algorithm can register with different complexity models that require different amounts of computational resource.

The specialized assessors provide an estimate of their accuracy $G(A_k)$ which can be interpreted as an amount of uncertainty in the $P(s_i, s_j)$ that assessor $A_k$ will compute. There could also be inaccuracy in the computation of the collision location and the benefit of warning. Such inaccuracy could also be incorporated into the expression of accuracy.

Note that not all preliminary assessments require specialized assessment. In particular, some of the scenarios involve erratic behavior which involves widely flared cones during preliminary assessment. In the case where good prediction models are not available and the need for warning is high, the preliminary assessment alone can be sufficient to provide warnings to the driver.

For scenarios that would benefit from more accurate assessments, the preliminary assessor determines where computational resources are best spent. Below are several important goals:
1. To minimize unnecessary warnings due to the preliminary assessor overestimating a potential collision.
2. To ensure that no scenarios are overlooked due to the preliminary assessor underestimating a potential collision.
3. For those scenarios that are likely to generate warnings, it is important to have the entire specialized assessment accurate, particularly the timing of the potential collision and the lead time necessary for warning. When scheduling actual warnings, the HMI might insert some waiting time before a warning deadline when there is plenty time remaining in the hopes that warning will prove unnecessary. Safe insertion of such a waiting time requires accurate specialized assessment.

It is expected that there will be sufficient computational resources to perform preliminary assessment on 3-4 orders of magnitude more scenarios than will prove serious enough for warning, and to perform specialized assessment on 1-2 orders of magnitude more scenarios than will prove serious enough for warning. This excess computational resource influences the resource management problem, because the system can use less complex and less risky approaches.

A possible approach to resource management is to analyze the impact of running each potential specialized assessor on each scenario according to its cost and potential benefit to the quality of warnings. Performing this cost-benefit analysis for resource allocation would: (1) allocate resources according to how close the preliminary assessment is to the warning threshold (preliminary assessments closer to the threshold would receive more resources), and (2) when possible, allocate resources to faster running specialized assessors.

In one embodiment, the system divides a time slice into two parts. In the first part, the system first ranks the preliminary assessments by the expected benefit of issuing an instant warning: $P(s_i, s_j) \cdot S(s_i, s_j)$, and then allocates the rest of the first part of the time slice to the top items on this ranked list. Note that the system is not issuing warnings, but just determining which preliminary assessments deserve a specialized assessment. The actual warnings will most likely be generated for scenarios near the top of this list. Hence, allocating most of the computational resources to moderately expensive and reasonable accurate specialized assessment algorithms (e.g., IMM Kalman filtering) will almost certainly cover the most critical scenarios. Such algorithms are significantly more accurate than the preliminary assessor and sufficiently inexpensive that in this first part the system can apply specialized assessment to many more scenarios than those that require actual warning. This is a conservative approach to resource allocation that addresses criteria 1 and 2 above.

In the second part of a time slice, an additional amount of computational resource is allocated to more expensive specialized assessors (e.g., particle filters) to improve the quality of the specialized assessments of scenarios at the top of the $P(s_i, s_j) \cdot S(s_i, s_j)$ list and to cover the more likely scenarios to generate warnings. In one embodiment, the amount of the time slice devoted to higher quality assessors can be fixed (e.g. 30%) or it can be adapted to the situation. It may be adequate that all the specialized assessment be preformed by the IMM Kalman filtering described above. This approach addresses criterion 3 above.

When a specialized assessor is first invoked on a scenario, there can be additional computation required to start a specialized assessor that might not be required during subsequent specialized assessments of the same scenario. This difference between start-up cost and incremental cost is incorporated into the resource allocation described previously. Specialized assessors are applied sequentially from the top of the ranked list, and each specialized assessor reports its cost (start-up or incremental) which is deducted from a budget for the time slice.

The preliminary assessment and specialized assessment might disagree on the severity of a potential accident. This is especially likely due to the conservative worst-case coverage of the segmented cones. The preliminary assessment might often consider a scenario serious, when more accurate specialized assessment reveals that collision is unlikely and warnings are unnecessary. For determining eventual warnings, the system uses the more accurate specialized assessments. (Note that, when there is no available specialized assessor, the preliminary assessment is treated as a specialized assessment.) However, at this intermediate stage, when resources are being allocated to specialized assessors, the preliminary assessment is still important. In particular, the system ensures that, when there is a disagreement between the preliminary assessment and the specialized assessment, the preliminary assessment does not repeatedly start a specialized assessment only to have it stopped afterwards.

This potential oscillation can be avoided by using the maximum of the preliminary assessment and the specialized assessment in the ranking described previously. This way, as long as the preliminary assessment determines that a scenario is critical, a specialized assessor will continue to run in its lower-cost incremental mode. While this might seem unnecessary, it is important to continue the specialized assessment. The reason for which the preliminary assessment is overly cautious in a previous time slice may not be same reason that it is cautious in the current time slice. Therefore, it is undesirable for the specialized assessor to suppress future specialized assessments.

Grouping

Large densities of pedestrians can create an unusual challenge for the tracking system. In one embodiment, the reasoning layer aggregates pedestrians into groups before invoking a specialized assessor.

For purposes of warning the driver, any large contiguous group of pedestrians should be avoided. In one embodiment, the system uses a set-union algorithm. Any two pedestrians within a car's width are placed in the same group, and if they are in different groups, the set-union algorithm joins the groups. Details of set-union algorithms are provided in Corman et al., "Introduction to Algorithms," McGraw-Hill 1998, pages 440-464, which is incorporated herein by reference. In some embodiment, the set-union algorithm operates using a distance function that is the Euclidean distance metric between the positions of principals. Note that the distance function can be more general. For example, the distance function can be based on the positions and/or velocities of the principals. The term "distance function" is used to indicate that it can also be heuristic and does not necessarily obey the strict mathematical properties of a distance metric to be useful for grouping principals.

For specialized assessments, smaller and more coherent groups are more useful. For this purpose, the system adopts a k-means method for grouping. The k-means algorithm can use a distance function. In one embodiment, the distance function can include the location of pedestrians (so that nearby pedestrians are grouped together) and/or the velocity of pedestrians (so that pedestrians crossing the street in the same direction are grouped together). More specifically, the distance function can be the Euclidean distance in a four dimensional space formed by concatenating the two dimensional position (in the X-Y plane) of a principal with the weighted two dimensional velocity (in the X-Y plane) of the principal. The result is that all pedestrians in a group are close to the group center and move at speeds close to the speed of the group center. Specialized assessment is then applied to the group center. Details of the k-means algorithm is provided in J. B. MacQueen, "Some Methods for classification and Analysis of Multivariate Observations," Proceedings of 5th Berkeley Symposium on Mathematical Statistics and Probability(1967), Berkeley, University of California Press, 1:281-297, which is incorporated herein by reference.

Figure 15:
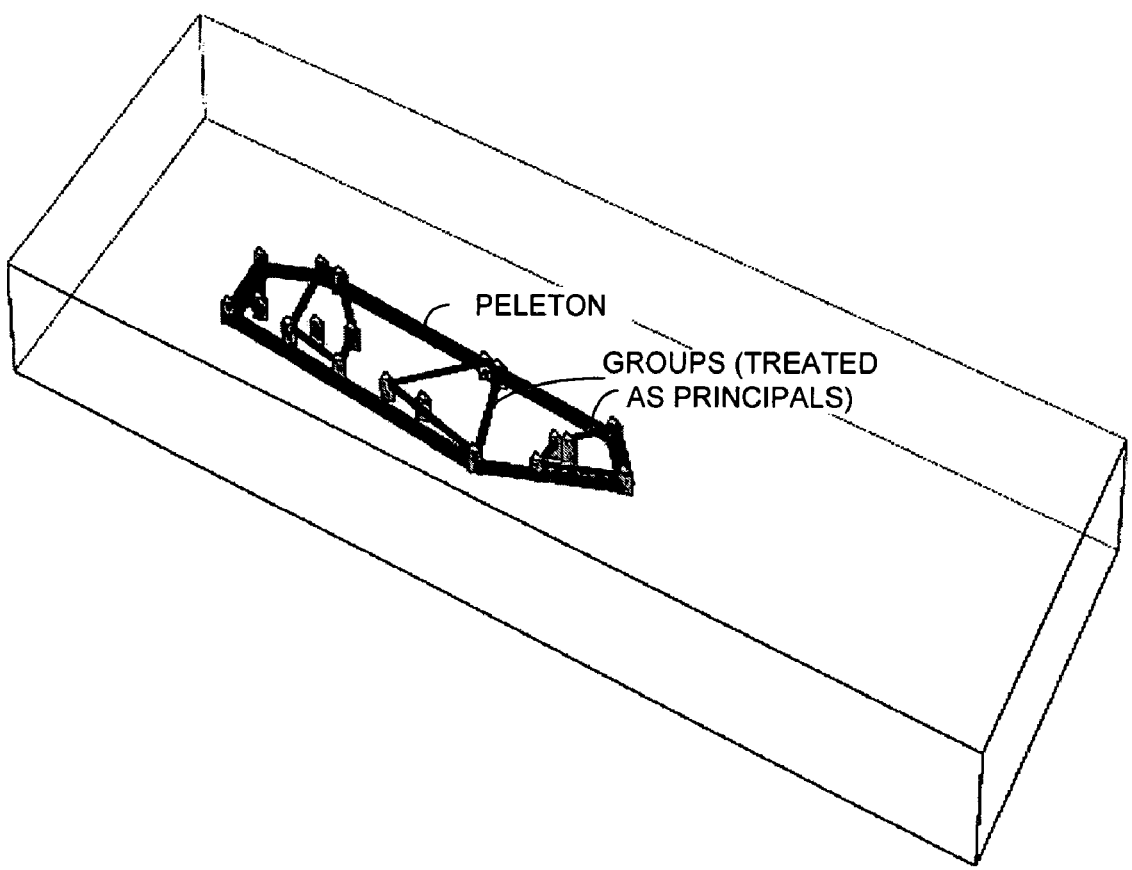
FIG. 15 illustrates the two type of grouping applied to pedestrians in accordance with one embodiment of the present invention.

In one embodiment, the system employs these two approaches to grouping hierarchically. First, the pedestrians are grouped into large groups based on the set-union algorithm. These groups are referred to as "peletons." The large peletons are then subdivided into smaller, more coherent groups using the k-means algorithm. These smaller groups are treated as single principals for purposes of specialized assessment. One advantage of such hierarchical grouping is that two types of groups are suitable for two different uses of the grouping: the high-level groups are useful for warning and the low-level groups are useful for tracking. A further advantage is that the high-level groups define good domains for the operation of the low-level grouping. FIG. 15 illustrates the two type of grouping applied to pedestrians in accordance with one embodiment of the present invention. Note that the system can continuously update the grouping based on the dynamic movements of pedestrians.

Although the description above teaches how the reasoning layer performs grouping of principals, such grouping is not limited to the reasoning layer. In some embodiments, grouping can occur during sensing. For example, sensors may optionally choose not to report individual pedestrians, but instead report a group of pedestrians. In these situations, the reasoning layer can directly treat the groups reported by the sensors as principals, or further aggregate these groups with other pedestrians to form different principals using the above described approaches.

Furthermore, grouping may also occur later in a decision adaptor. Decision adaptors customize the warnings for a HMI, and are described in more detail in subsequent sections of this disclosure. A decision adaptor may find it beneficial to group several possible collisions into one warning to simplify the presentation to the user.

Specialized Assessment

As described in previous sections, the preliminary examines all pairs of principals (vehicles, pedestrians, or bicyclists) and identifies possible collision incidents. Since there could be many cars or pedestrians at a busy intersection, this screening task ideally is to be performed quickly at a low computational cost, since accuracy is not a concern in the preliminary assessor stage. It is left to the specialized assessor to perform accurate risk assessment at a higher computational cost. This section describes the design of a specialized assessor.

Figure 16:
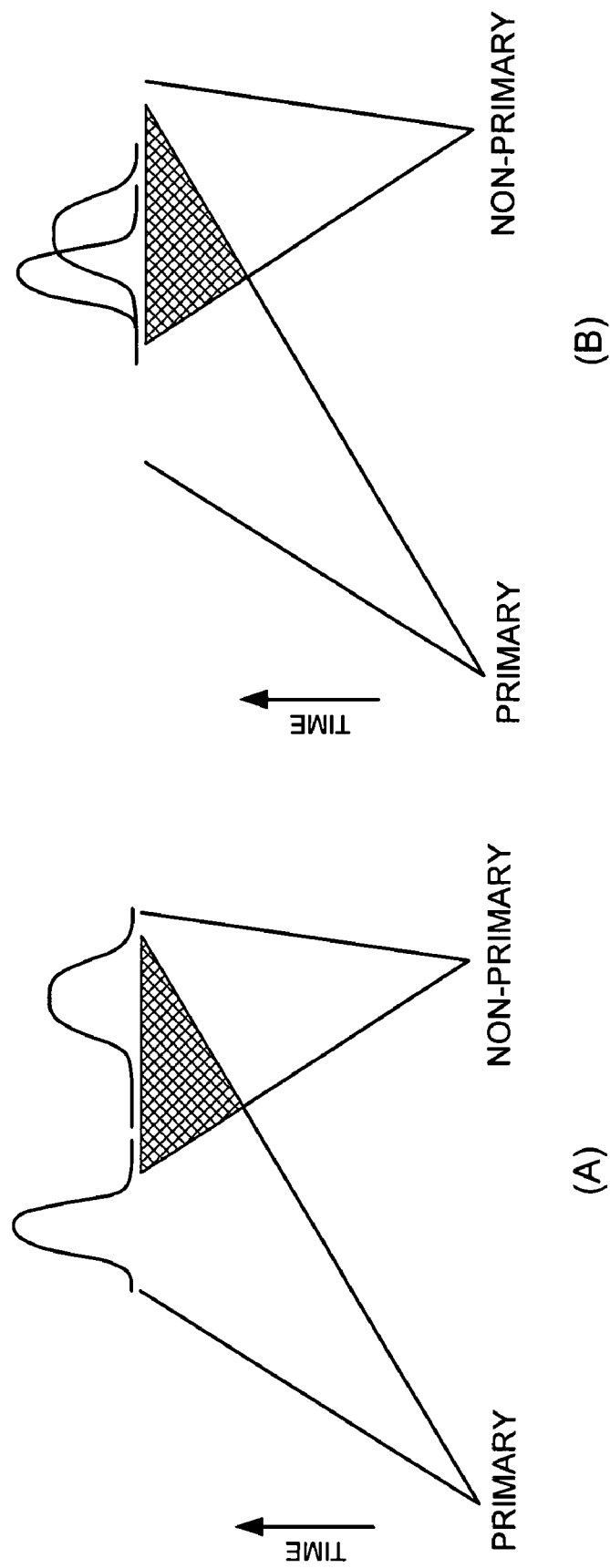
FIG. 16 illustrates an exemplary computation by a preliminary assessor in accordance with one embodiment of the present invention.

To illustrate the need for accurate risk assessment, consider the computation by a preliminary assessor shown in FIG. 16. The preliminary assessor assesses risk by intersecting two cones projected into the future, corresponding to the primary principal and a non-primary principal. If the two cones intersect, the preliminary assessor calculates the collision risk based on the overlapping area (marked by the cross-hatched area). The bigger the overlapping area is, the higher the possibility that the two principals will collide.

The above assessment is intuitively correct, but is based on the implicit assumption that the principal lies in the cone with a uniform distribution. This approximation often does not reflect the reality. For example, part (A) of FIG. 16 shows the situation where the primary principal is likely to be on the left edge of the cone (as indicated by a probability distribution function on the left), resulting in a low probability of collision with the non-primary principal. In contrast, part (B) of FIG. 16 shows the opposite situation where the primary principal is likely to be on the right edge of its cone and the non-primary principal is likely to be on the left edge of its cone, resulting in a high collision probability. The preliminary assessor cannot distinguish these two scenarios, because regardless of what the probability data suggests, the preliminary assessor predicts the same collision risk. This example shows the limitation of preliminary assessor and calls for a more stochastic approach for accurate risk prediction. The specialized assessor performs such a prediction.

Continuous risk assessment is a key feature of the specialized assessor. Initially, the specialized assessor is instantiated by the preliminary assessor for any potential collisions. Once created, the specialized assessor infers from historical data the state of the principals and predicts collision risks within a look-ahead horizon. As time advances and new data is received, the specialized assessor adjusts the assessed risk incrementally. The assessed risk is then reported back to the preliminary assessor.

In a sense, the preliminary assessor takes a "management" role by creating specialized assessors for accurate risk assessment, managing multiple specialized assessors, and collecting information from them. The preliminary assessor delivers the collected information (specialized assessments) to the HMI in a form that allows the HMI to decide whether to warn the driver. In general, the preliminary assessor operates conservatively in identifying potential incidents. If a specialized assessor suggests that two vehicles are not likely to collide, the preliminary assessor may terminate the specialized assessor and use the computation resource for more serious problems.

Compared with other collision avoidance systems, another important feature of the reasoning layer is early warning. This avoids the need to warn only moments before impact, when only emergency maneuvers can prevent an accident. For early collision prediction, the system predicts collisions well ahead of the collision time. In one embodiment, the specialized assessor formulates the risk-assessment problem as a statistical model-based inference problem. Furthermore, principals are associated with a library of models, including a dynamics model specifying the way the vehicle moves, and the driver's mental-state model specifying how the driver acts based on the surrounding environment. Some of these models are long-range in nature and are capable of predicting future states in a few seconds, as opposed to a fraction of a second in many existing collision warning systems. These long-range models enable early collision warning.

There are several additional advantages to a model-based approach for specialized assessment. Model-based approaches are flexible and allow new models to be integrated and existing models to be modified without the need to completely re-design the system. For example, the system can update or replace a dynamics model specific to a vehicle without changing any of the other algorithms in the system. Another advantage of the model-based approach is that it makes the system independent of training data and statistical learning. It is possible to plug in fixed, a priori models. It is also possible to use training data and statistical learning to improve the models before plugging them into the system. Furthermore, it is possible to improve the models dynamically when the system is running.

In one embodiment, the specialized assessor adopts a statistical formulation in applying the models. The statistical approach can take into consideration all the variables in terms of probability in a state space, allowing imperfect observations to be described on equal ground. Different sensing models can be combined rigorously. This is especially important in a heterogeneous sensing environment, where multiple types of sensors (radar, camera, RFID, etc.) can be used in the same intersection. The system can choose from a diverse collection of techniques such as particle filters, Kalman filters, and hidden Markov models (HMM).

Specialized Assessor Models

Using a model-based approach, the specialized assessor fits the data to a pre-defined model and makes inferences about the underlying state. For example, from the principal's previous states, such as position and velocity, the system can learn about the attentiveness of drivers. The system then predicts the future states based on this inferred driver state, the current state of the principal, and the corresponding dynamics and driver mental state models.

Dynamics Model

The dynamics model specifies the way a principal moves. In one embodiment, the system adopts a "relaxed slotcar" model to describe the movement of a vehicle. (A slotcar is a powered miniature toy automobile which is guided by a groove or slot in a track.) In a relaxed slotcar model, the vehicle follows a pre-defined desired trajectory, e.g., going along a straight line or following an arc when turning, but is allowed to deviate from the trajectory to simulate real-world driving behaviors. The preliminary assessor specifies the desired trajectory. For instance, the preliminary assessor assesses various possibilities and identifies a potential incident, "vehicle A going straight may collide with vehicle B turning left." It then provides the associated trajectories, "A going straight and B turning left," to the specialized assessor. The specialized assessor operates on a specific scenario, that is, it assumes that the models given are correct. If there is ambiguity about what the vehicles might do, for example, B might turn right, then additional specialized assessors can be instantiated to assess the potential collisions of each alternative.

Figure 17:
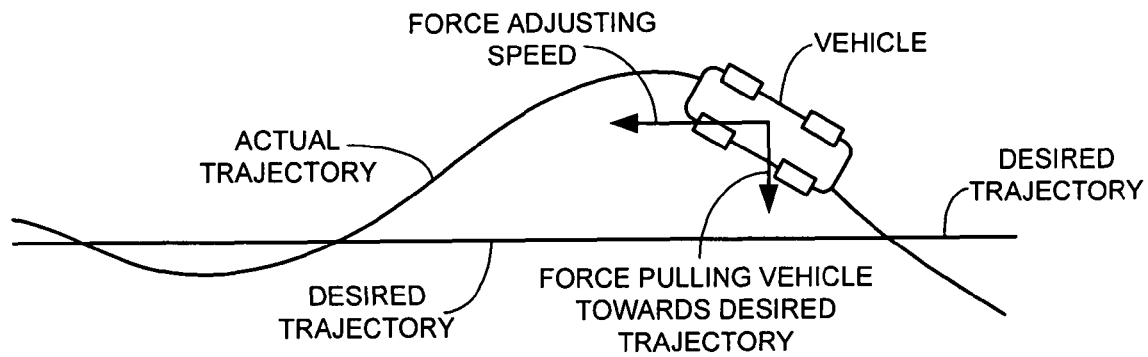
FIG. 17 illustrates a relaxed slotcar model in accordance with one embodiment of the present invention.

FIG. 17 illustrates a relaxed slotcar model in accordance with one embodiment of the present invention. The desired trajectory is a straight line. However, real-world driving rarely follows a straight line exactly. These deviations are modeled by making the vehicle subject to two forces: a "vertical" force pulling the vehicle towards the desired trajectory if it deviates, and a "horizontal" one adjusting the speed toward some target speed. If the vehicle is going too slow or too fast, it has a tendency to speed up or slow down to the target speed. The target speed is a parameter which may depend on several factors: the driving habit of the driver, the speed limit at the current location, and the speed of cars around the primary vehicle. Some of these parameters can be learned and carried along with the vehicle (such as the driver's usual speed); others (such as the speed limit) may be obtained and stored locally in the intersection infrastructure. For pedestrians, the system can use a similar dynamics model, but with different parameters.

Driver Alertness Model

Driver (and/or pedestrian) alertness is important to risk assessment. If a driver is alert, he/she has less chance of colliding with others, even if the vehicle is going fast. Furthermore, issuing a warning to a driver already paying attention might be a distraction and presents no benefit to the driver. In one embodiment, the specialized assessor seeks to infer the driver's alertness from the vehicle history data.

Figure 18:
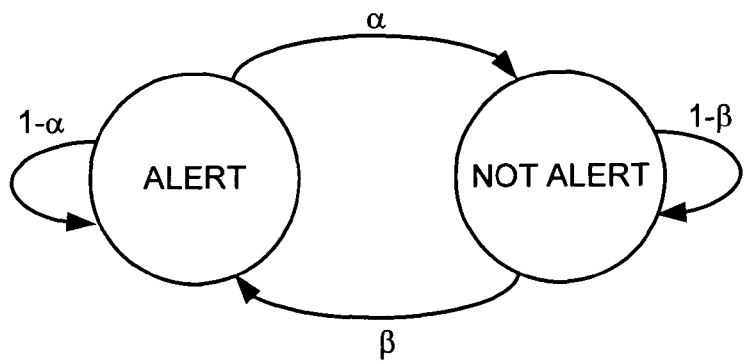
FIG. 18 illustrates a state transition diagram for the driver alertness model in accordance with one embodiment of the present invention.

In one embodiment, the driver alertness state is formulated as a binary variable with a value of 0 for the non-alert state, and 1 for the alert state. FIG. 18 illustrates a state transition diagram for the driver alertness model in accordance with one embodiment of the present invention. The alertness model is assumed to be Markovian: if the driver is alert at time t, he/she has probability $1-\alpha$ for staying alert at time t+1. The parameter $\alpha$ describes the drifting probability to the non-alert state. This disclosure uses the convention of t+1, t+2, . . . to refer to the subsequent time steps. However, since the rate of preliminary assessment to 2-5 times per second, a time slice could be less than one second, and a more precise representation of the time slices can be written as t+$\delta$, t+2$\delta$, . . . , where $\delta$ is the size of one time slice. The same is true for the transition from the non-alert state back to alert with a probability $\beta$.

In one embodiment, the probabilities $\alpha$ and $\beta$ are assumed to be small (<0.1). Furthermore, if the driver is in the alert state, and he/she realizes the potential danger of hitting another vehicle/pedestrian, then $\alpha$=0. That is, he/she will pay conscious attention and will not drift to non-alert state before the danger clears.

In addition, or alternatively, the system can adopt a "rational-decision" model, where the driver rationality is formulated as a binary variable with a value of 0 for the "irrational-decision" state and 1 for the "rational-decision" state. This driver rationality variable indicates whether the driver makes a rational decision on his/her judgment about potential collision. For example, realizing the danger of a potential accident, most drivers will step on the brake or take correct maneuvering actions. However, some drivers may step on gas pedal instead, or maneuver incorrectly. Hence, some drivers, such as student drivers, elderly, or teenagers may be considered "irrational" because of their incapability to take correct actions to avoid the accident. In one embodiment, the system specifies the probabilities of the driver's mental state transitioning from the "rational-decision" state to the "irrational-decision" state, and vice versa.

Risk Assessment as an Inference Problem

In the embodiment described above, the specialized assessor assesses collision risk by inference in the state space (position, velocity, and alertness) based on models of behavior. At any time slice t, the preliminary assessor solves the following two problems:

Filtering (estimation): Given the observation data up to time t, what state is the vehicle in?

Prediction: Given that the vehicle's current state at t, what state will the vehicle be in at time t+1, t+2, . . . , t+N, where N is the prediction horizon?

For the filtering problem, the system adopts the generic formulation of sequential Bayesian filtering. Here the observation at time t is denoted as $z^t$, and the observation history (from time 0 up to t) is denoted as $\overline{z^t}$. Sequential Bayesian filtering updates the posterior of a underlying state x as:

$$p(x^{t+1} | \overline{z^{t+1}}) = \gamma \cdot p_o(z^{t+1} | x^{t+1}) \cdot \int_X p_d(x^{t+1} | x^t) \cdot p(x^t | \overline{z^t}) dx^t. \quad (2)$$

The integral makes a single step of prediction to bring the previous state up to the current time and then applies a new external measurement to modify the state. The system does this filtering using an object dynamics model $p_d(x^{t+1}|x^t)$. In one embodiment, the dynamics obeys the relaxed slotcar model and the alertness model. The prediction is then multiplied by a likelihood, reflecting the contribution of observation $z^t$, using an observation model $p_o(z^{t+1}|x^{t+1})$. The constant $\gamma$ is a normalization constant to make $p(x^{t+1}|\overline{z^{t+1}})$ integrate to one. The filter (2) is sequential: the current filter distribution $p(x^{t+1}|\overline{z^{t+1}})$ is computed from the previous filter distribution $p(x^t|\overline{z^t})$ at every step.

In one embodiment, solution of the prediction problem is described as follows. Without any observation input, the derivation is based entirely on the car dynamics and driver alertness model:

$$p(x^{t+2} | x^t) = \int_{x^{t+1}} p(x^{t+2} | x^{t+1}) \cdot p(x^{t+1} | x^t) dx^{t+1}; \quad (3)$$

$$\vdots$$

$$p(x^{t+N} | x^t) = \int_{x^{t+N-1}} p(x^{t+N} | x^{t+N-1}) \cdot p(x^{t+N-1} | x^t) dx^{t+N-1}.$$

From the predicted states of the primary and non-primary principals from t to time horizon t+N, the specialized assessor can evaluate risks and predicts (1) whether an accident is likely, (2) when and where the accident may occur, and (3) how severe the accident is. This information is then returned to preliminary assessor, delivered to the HMI module, and possibly results in a warning to the driver.

For the filtering and prediction problem, several techniques can be used. In one embodiment, the system adopts both Kalman filter-based Interacting Multiple Models (IMM) and particle filtering. IMM appears to be more computationally efficient and less accurate than the particle filter. Note that the resource manager, as described earlier, can use the IMM approach for most scenarios requiring specialized assessment, and reserve particle filtering for cases that require high accuracy or have models with characteristics that are difficult for the IMM approach to capture. Details of Kalman filter-based IMM are provided in Kalman, "A New Approach to Linear Filtering and Prediction Problems," Transaction of the ASME—Journal of Basic Engineering, 82:35-45, 1960; Welch et al., "An Introduction to the Kalman Filter," 2001 SIGGRAPH tutorial; and Sorenson, "Kalman Filtering: Theory and Application," IEEE Press, 1985, all of which are incorporated herein by reference. Details of particle filters are provided in Doucet et al., "Sequential Monte Carlo Methods in Practice," Springer-Verlag, New York, 2001; and Arulampalam et al., "A Tutorial on Particle Filters for On-line Non-linear/Non-Gaussian Bayesian Tracking," IEEE Transactions on Signal Processing, 50(2): 174-188, 2002; both of which are incorporated herein by reference.

Particle Filtering

In one embodiment, filtering may be performed using Particle Filters. Particle filtering is a nonparametric Monte Carlo sampling-based method. It represents a continuous probability density function as a set of weighted point samples, referred to as a particle set. Each particle i in the particle set is a pair $(x_i, w_i)$, where $x_i$ is an element of X and $w_i$ is a real number between 0 and 1 with the constraint that $$\sum_{i=1}^{n} w_i = 1$$

when there are n particles in the particle set.

To emulate the filter equation (2), assume that the previous target belief $p(x^t|\overline{z^t})$ is represented by a particle set $A^t$. At each step, each particle $(x_i^t, w_{i,t})$ in $A^t$ is first propagated independently according to the model $p(x^{t+1}|x^t)$ by some sampling technique such as a Gibbs sampler. That is, for each i, the system computes the state of the ith new particle, $x_i^{t+1}$, to be the result of sampling from $p(x^{t+1}|x_i^t)$. The resulting set of particles $$\{(x_i^t, w_i^{t-1})\}_{i=1}^{n}$$

correspond to the predicted belief at time t in equation (2). Then, each particle of the predicted belief is re-weighted with the observation model $p(z^t|x^t)$. That is, the new weights are given by $$w_i^{t+1} = \alpha \cdot w_i^t \cdot p(z^{t+1}|x_i^{t+1})$$

where $\alpha$ is a normalization constant to keep the sum of the weights equal to one.

This step is analogous to multiplying the predicted belief with the likelihood in equation (2). The resulting particle set $$A^{t+1} = \{(x_i^{t+1}, w_i^{t+1})\}_{i=1}^{n}$$

corresponds to the updated filtered belief $p(x^{t+1}|\overline{z^{t+1}})$.

Since the system only maintain a finite number of particles in practice, the last step is a re-sampling step according to the weights $w_i$, which is performed on the particle set $A^t$ so that the particles with small weights are eliminated (since these particles correspond to unlikely target states) and replaced by multiple samples of the particles with large weights, allowing the regions around the likely states to be explored more thoroughly). This re-sampling step is critical in order for the particle set to remain a faithful representation of the updated belief, although it does not necessarily need to be performed at every time step.

The advantage of the particle filter is its remarkable flexibility. It can accommodate any form of dynamics $p(x^{t+1}|x^t)$, with no constraint that it has to be linear or Gaussian. The observation model $p(z^{t+1}|x^{t+1})$ can be applied directly to each particle straightforwardly. In one embodiment, the dynamics model is conditioned on the alertness state: if a particle corresponds to a non-alert state, or an alert state with no collision danger is detected, the particle will be predicted forward using the relaxed slotcar model with a certain target speed (e.g., 50 kmph). On the other hand, if the particle corresponds to an alert state with immediate danger detected, the particle follows the slotcar model with a target speed of 0, i.e., the driver attempts a full stop before the collision happens. The alertness state of the particle then follows the driver alertness model. If a new model needs to be incorporated, only the model part needs to be changed. The particle filter part remains the same. This approach reduces implementation complexity.

Note that ideally a sufficient number of particles are to be simulated to maintain the representativeness. If too few particles are used, the particles do not represent an accurate approximation to the underlying probability distribution. In practical situations, the high computational complexity may make this infeasible. Hence, in one embodiment, particle filtering is reserved for only serious potential collisions and complex models.

Kalman Filtering

In some embodiments, Kalman filtering may be used. Kalman filtering is a special case of sequential Bayesian filtering under the assumption that the object dynamics and the observation model are both linear in $x^t$, and that the uncertainty in both models are Gaussian. Under these two assumptions, the posterior belief $p(x^t|\overline{z^{t+1}})$ is also Gaussian. Because a Gaussian distribution can be completely characterized by its mean and covariance, the Kalman filtering equations update the mean $$\hat{x} \triangleq E[x^t | \overline{z^t}]$$

and the variance $$P^t \triangleq E[(x^t - \hat{x})(x^t - \hat{x})^T]$$

sequentially as measurements are observed.

However, the performance of Kalman filtering might be limited in some cases by its modeling assumptions. Kalman filtering is generally good for situations where target dynamics are relatively linear, and the sensors produce spatially-compact observations. In collision prediction applications, the target dynamics are clearly non-linear: they depend on a driver alertness state. Moreover, in many scenarios the vehicles follow curved, non-linear trajectories. Finally, in some cases, observations may not be linear or Gaussian for certain sensors (e.g., data collected by radar range sensors which produce non-Gaussian observations in a 2-D location space).

In one embodiment, instead of operating in the state space (position, velocity, alertness), the system linearizes the Kalman filtering with respect to the desired trajectory. The position is mapped to tangential and perpendicular components ($pos_{tang}$, $pos_{perp}$), and likewise for the velocity state. The tangential and perpendicular directions are defined based on the desired trajectory and the current position. For example, if the desired trajectory is an arc corresponding to a turn, the perpendicular direction is along the radius. This way, the system can resolve the linearity constraint of Kalman filtering for vehicle maneuvering dynamics. However, two problems still remain: the driver alertness model is non-linear, and the observation model may be nonlinear or non-Gaussian.

Interacting Multiple Model (IMM) Kalman Filtering

In further embodiments, the Interacting Multiple Model (IMM) algorithm may be used. The IMM algorithm is a method for filtering in linear systems with Markovian transitions. For example, a vehicle may have multiple maneuvering modes (stopping, accelerating, steering, etc.). Within each mode, the vehicle follows a linear dynamics model. The vehicle may switch from one maneuvering mode to another, and the mode switching event is assumed to be Markovian. IMM formulates the filtering problem as a hypotheses management problem, where the hypotheses $\{H_1, H_2, \ldots H_N\}$ are the different maneuvering modes with probability $\{(\mu_1, \mu_2, \ldots, \mu_N)\}$, respectively, wherein $$\sum_i \mu_i = 1.$$

The goal is to update the posterior probability for each hypothesis $\mu_i^t$ based on the observation history $z^t$. The goal is to estimate $\mu^t$ sequentially as time t advances. Details of IMM are provided in Blom et al., "The Interacting Mutiple Model Algorithm for Systems with Markovian Switching Coefficients," IEEE Transaction on Automatic Control, 33(8): 780-783, 1988; and Kalandros et al., "Tutorial on Multisensor Management and Fusion Algorithms for Target Tracking," In Proc. Amer. Control Conf., Boston, Mass., July 2004, both of which are incorporated by reference herein.

At any point of time t, the system starts with a hypothesis prior set $$\{\mu_j^t, j=1, \ldots, N\},$$

where $\mu_j^t = p(H_j^t | z^t)$. Assume that at time t+1 hypothesis $H_i$ is true. Given that the system is linear and Gaussian under $H_i$, the Kalman filter is appropriate. One can update the state estimate and corresponding covariance, and compute the likelihood $p(z^{t+1}|H_i)$. The hypothesis probability can then be updated as:

$$\mu_i^{t+1} \propto \sum_j [\mu_j^t \cdot p(H_i^{t+1} | H_j^t) \cdot p(z^{t+1} | H_i)]$$

IMM methods is particularly suitable for collision prediction applications because they handle the two-state (alert vs. non-alert) model above very easily, and it is expected that specialized tracking of most real-world driving will contain several distinct modes like these.

Collision Prediction for Pedestrian Groups

Figure 19:
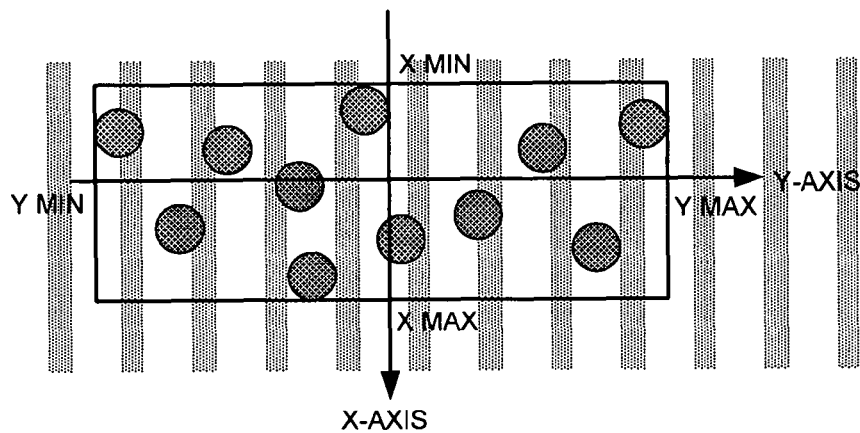
FIG. 19 illustrates an exemplary pedestrian bounding box defined in a coordinate system of a crosswalk in accordance with one embodiment of the present invention.

Pedestrian groups are treated similarly to individual pedestrians, but in a higher dimensional state space (position, velocity, alertness, extent). The new element extent denotes the bounding box of the pedestrian group. FIG. 19 illustrates an exemplary pedestrian bounding box defined in a coordinate system of a crosswalk in accordance with one embodiment of the present invention. The origin is the center position of the pedestrian group. The Y-axis is along the direction of the crosswalk, and the X-axis is along the short-side of the crosswalk. The bounding box is the rectangle enclosing all pedestrians in the group, defined as:

extent=$(x_{min}, x_{max}, y_{min}, y_{max})$, as illustrated in FIG. 19. The bounding box follows a simple dynamics model, in which all four sides expand over time. This is to simulate the practical situation that pedestrians move with various pace, causing the group to be change its size. The bounding box is used for collision prediction.

The state (position, velocity, alertness) are defined with respect to the center of the pedestrian group. It is assumed that the group is moving homogeneously; hence the group can be treated the same way as a single pedestrian. On the other hand, if the group is non-homogeneous, the preliminary assessor will split groups into smaller groups, each maintaining a level of homogeneity.

Format of the Specialized Assessment

Based on the forward prediction described in earlier sections, a specialized assessor computes an assessment for every time slice. In one embodiment, the assessment at time t includes the following information:

$s_i$ and $s_j$, the scenarios that the principals are following. A scenario includes trajectories, text descriptions, and other useful information for presenting warnings.

P(t), the probability assessed at time t that there will be a collision in the future assuming that the principals follow the $s_i$ and $s_j$ scenarios. This probability is conditioned on the scenarios.

T(t), the expected time of the collision. This value, and all the following components of the specialized assessment, are conditioned on the collision probability, P(t), and on the scenarios $s_i$ and $s_j$.

L(t), the predicted location of the collision.

B(t, t'), the predicted benefit of warning assessed at time t but to be issued at some future time t' relative to the current time. This component will be used to schedule warnings, that is, to delay warnings to increase certainty when there is no loss of benefit.

g(P(t)), an estimate of the accuracy of the specialized assessment. This component can be interpreted as a spread or uncertainty in P(t). For simplicity only an accuracy rating for P(t) is included, even though there can be uncertainty associated with all the values in the specialized assessment.

Since all the components of the specialized assessment are parameterized by the current time t, parameter t can be safely omitted in the following discussion. However, the t' parameter in B(t') is retained to distinguish that result, since it describes a function of values at future times.

Figure 20:
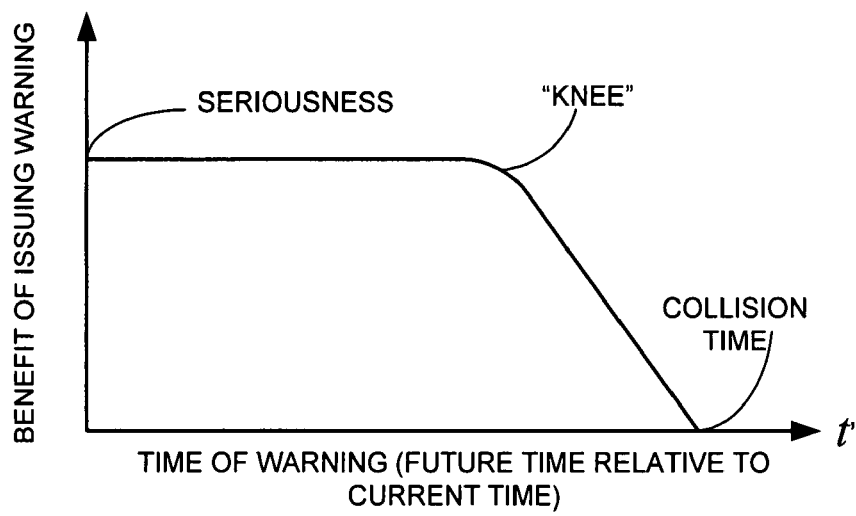
FIG. 20 presents the plot of an exemplary benefit function in accordance with one embodiment of the present invention.

FIG. 20 presents the plot of an exemplary benefit function in accordance with one embodiment of the present invention. The prominent feature of the benefit function is a "knee" in the function. Before the time corresponding to the knee, the driver has time to consider the warning, react, and to safely avoid the accident (e.g., by slowing down the vehicle). The height of the benefit curve before the knee is proportional to the severity of the accident. Note that, in one embodiment, the height also takes into consideration the possibility that the driver, without receiving a warning, will perceive and avoid the accident. That is, the benefit function may represent the differential benefit of issuing a warning as compared with not issuing a warning.

In one embodiment, the scale of the benefit function is a unit-less value between 0 and 10. Like the preliminary assessment, this is not meant to make fine distinctions between the injuries and damage resulting from different kinds of collisions. It is expected that all serious injury accidents have similar values near 10. The scale between 0 and 10 allows for very low-velocity collisions to be treated with less aggressive assessment and warning.

Note that the benefit function makes optimistic assumptions about the HMI. It assumes that a warning, when issued, will be effectively communicated to the driver. However, as disclosed in later sections, an HMI can allow for less than optimal communication efficiencies. Also, the benefit function does not include any penalty for distracting the driver with unnecessary warnings. This distraction factor can also be accounted for by the HMI.

Although a general benefit function may take up different shapes, without losing generality, one embodiment of the present invention uses a combination of two linear pieces to represent a benefit function. Such a representation facilitates fast computation because it can specify a benefit function with 3 scalar parameters.

Assessments Become Warnings (HMI)

The ultimate goal of an early warning system is to issue warnings to the driver in a way that prevents accidents and avoids dangerous emergency maneuvers. This is the purpose of all the careful assessments of accident scenarios, but these assessments do not directly dictate delivery of warnings to the driver. Instead, these assessments are used to make the critical decisions on if, when, and how to warn the driver—decisions that depend on the characteristics of specific HMIs.

For example, warnings displayed on head-up displays might have different characteristics from warnings issued with sounds. For this reason, the reasoning layer provides careful assessments, but it is the interface associated with specific user interface systems that make the critical warning decisions. In one embodiment, this interface is referred to as the "decision adaptor." A decision adaptor receives assessments at every time slice and determines which assessments are to become warnings.

While it would be ideal for each HMI to provide its own decision adaptor, a decision adaptor can also be included with the reasoning layer. This decision adaptor is first calibrated with a set of parameters specific to the HMI; it then receives the assessments from the reasoning layer, filters them, and passes on to the HMI only those assessments that require immediate warning.

If, When, and How to Warn

Fundamentally, it is best to warn the driver about the most serious potential accidents. Here the assessments contain information necessary to arrive at an expected utility for warning. The product of the collision probability and the benefit of the warning is a good metric for ranking the warnings. However, this ranking alone may not be sufficient to schedule the warnings in the optimal way.

Suppose, for example, the system predicts with high probability that a vehicle is on a collision course with a bicycle—a serious collision, but the collision is not imminent. Should the driver be warned? Probably not immediately. If there is still plenty of time to warn the driver, it may be best to wait, because delaying the warning might resolve the problem in several ways. For instance, the driver may react to potential collisions on his/her own. Also, the delay may improve the accuracy of the prediction, because usually the probability will increase or decrease, and in the latter case a warning might be avoided. Avoiding warnings is important because warnings can distract drivers' attention, or in extreme cases, cause drivers to become so frustrated that they disable the warning system. Either way, unnecessary warnings are likely to cause additional accidents.

The system uses the information in assessments in determining how to delay warnings. In particular, the knee in a benefit function can be the critical last opportunity to warn the driver with sufficient time to avoid a collision. If there is plenty of time before the knee, then it is probably safe to wait.

However, another consideration in delaying warning is the possibility of the need for multiple near-simultaneous warnings. Many user interfaces cannot effectively issue simultaneous warnings. For example, spatially localized sound warnings are probably best serialized and sufficiently spaced apart so that each warning can be heard and associated with a direction of potential collision. Even head-up displays, which can simultaneously highlight many objects, may prefer flashing images sequentially to draw the user's attention to one particular scenario at a time.

In general, any system that is attempting to assist the driver ideally should allow the driver to absorb and form judgments about the appropriate actions. This creates a scheduling problem. Even when there is plenty of time for a single warning before the corresponding knee in its benefit function, there may not be enough time to schedule all currently pending warnings before their respective knees. Before delaying a warning, the system should allow sufficient time to issue other warnings for currently tracked scenarios, as well as allow time for unforeseen scenarios that might be discovered in the near future.

In one embodiment, the current updated assessments are provided in a batch at every time slice. This provides the information necessary for considering the warnings as a group, and for accommodating all the warnings that might be necessary in the near future. To issue a warning, a user interface obtains information on the current location of the other principal (for example, to issue auditory alarms that appear to be coming from direction of the other principal). Other user interfaces may diagram the accident by, for example, showing trajectories and potential collision points on a heads-up display. All of this geometric information is in the assessments delivered by the reasoning layer.

In further embodiments, some user interfaces may wish to aggregate warnings, especially when there is limited time to issue all warnings. The assessments provide both geometric information and grouping of principals to allow warnings to be aggregated.

In summary, the assessments provide useful information for deciding if, when, and how to issue warnings. The next section describes an example of how this information is used by a decision adaptor in scheduling and issuing warnings.

Decision Adaptor

In this example, the HMI is characterized by 5 parameters:

Warning rate W. This is a comfortable rate at which warnings can be absorbed by the driver. The system will strive to remain below this rate.

Maximum warning rate M. This is the maximum rate at which warnings can be issued to the driver. Typically, M is higher than W and is to be used sparingly in crises and when unanticipated scenarios arise.

Efficiency of warning Q. This is a factor with a value between 0 and 1, and which describes the effectiveness of warnings communicating to the driver.

Rate R at which the same warning is to be repeated, in case the driver has not headed the warning.

Penalty D for an unnecessary warning.

Threshold T for warning.

These parameters form an HMI model that the decision adaptor can use to customize the warnings to a specific HMI. More complex HMI models can also be accommodated by decision adaptors.

In each time slice, the decision adaptor receives the specialized assessments. The decision adaptor first ranks the assessments according to a utility function of a respective warning, defined as follows:

$$U = P \cdot Q \cdot B(0) - (1 - P \cdot Q) \cdot D$$

This formula computes a current utility measure for a warning by using some information from the corresponding assessments, i.e., P and B(0). The utility function further takes into consideration parameters Q and D from the HMI model.

Figure 21:
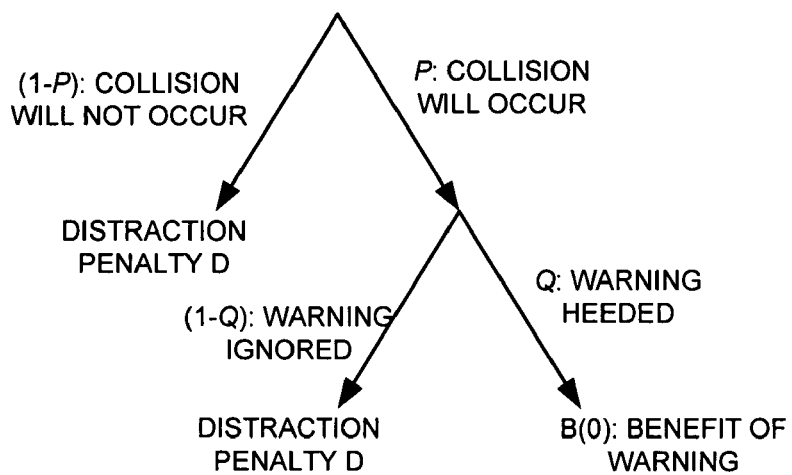
FIG. 21 illustrates a computation of a utility function associated with an assessment in accordance with one embodiment of the present invention.

The utility function can be interpreted as a pragmatic utility for warning. The product $P \cdot B(0)$ is the ideal utility for warning immediately, assuming the communication to be 100% effective (Q=1) and no penalty for distracting the driver (D=0). Note that B(0) is the benefit function evaluated at t'=0, and represents the benefit of warning before the knee as illustrated in FIG. 20. The utility function adds a degree of realism to the utility calculation, according to the logic illustrated in FIG. 21. As illustrated in FIG. 21, the utility is calculated as the benefit of warning minus the penalty of a non-occurring collision and the penalty of an ignored warning. Based on the probability logic illustrated in FIG. 21, the utility function can be derived as:

$$U = P \cdot Q \cdot B(0) - (1-P) \cdot D - P \cdot (1-Q) \cdot D$$
$$= P \cdot Q \cdot B(0) - (1 - P \cdot Q)$$

In one embodiment, only those assessments for which the utilities are above the threshold Tare considered for warning. These more serious assessments are referred to as "pending" assessments in a time slice. A scheduler then determines which, if any, of the pending assessments should be issued. The scheduler treats all of the knees of the benefit functions corresponding to these pending assessments as warning deadlines.

In one embodiment, the scheduler schedules the warnings in a backward direction with respect to the time axis. That is, the scheduler first ranks the assessment based on their expected benefits, and schedules the lowest ranked assessment first and as far into the future as possible. This way, the scheduler can allow sufficient spacing between warnings and can ensure that, on a best-effort basis, the warning schedule complies with the comfortable warning rate W. Note that this backwards scheduling scheme tends to place the highest ranked assessment first in the forward direction on the time axis. After scheduling, if there is time remaining before the first warning in the schedule, no warning is issued during the current time slice, and the procedure is repeated again in the next time slice.

Figure 22:
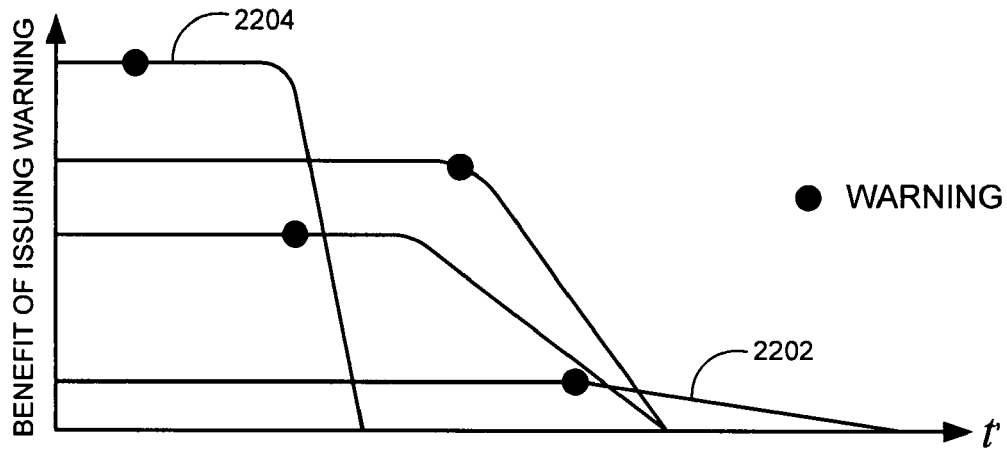
FIG. 22 illustrates an exemplary warning schedule in accordance with one embodiment of the present invention.

FIG. 22 illustrates an exemplary warning schedule in accordance with one embodiment of the present invention. As can be observed in this example, the aforementioned scheduling results in the warning for the assessment with the lowest benefit (assessment 2202) being scheduled at the latest possible time. The warning for the assessment with the highest benefit (assessment 2204) is scheduled at a much earlier time, before all the other warnings. Note that the warning for assessment 2204 is not scheduled at the earliest possible time, since it is better and safe to wait for reasons stated above.

If the scheduler cannot schedule all the warnings without time to spare, an immediate warning might be necessary. In this case, a warning is issued at the beginning of the schedule. The scheduler may also re-schedule the warnings with spacing corresponding to the maximum warning rate M to accommodate all the warnings. The difference between W and M allows for some unexpected, late arriving, high-ranked assessments to be accommodated in the schedule. In extreme cases, the scheduler may issue an "overload" warning indicating that it cannot schedule all the warnings without exceeding the maximum warning rate.

Note that the reasoning layer can also adopt other warning scheduling schemes, and that customized decision adaptors may include their own warning scheduling schemes.

Conclusion

This disclosure describes an architecture for a reasoning layer, which resides between a mechanism that obtains raw data about potential accidents and an HMI that delivers warning to drivers. This reasoning layer applies a library of scenarios to predict whether principals are likely to collide, and computes assessment of potential accidents. These assessments contain sufficient information for the HMI to effectively decide if, when, and how to warn the driver. The architecture includes a dual-assessment system. A preliminary assessor performs highly efficient geometric comparisons to compute a preliminary assessment of a potential accident. This preliminary assessment is used to manage computational resources and to launch specialized assessors. A specialized assessor applies stochastic techniques to collision models of the more serious scenarios and computes more accurate assessments. With these assessments, the HMI can provide drivers with early, accurate, low distraction warnings of accidents in complex scenarios.

Figure 23:
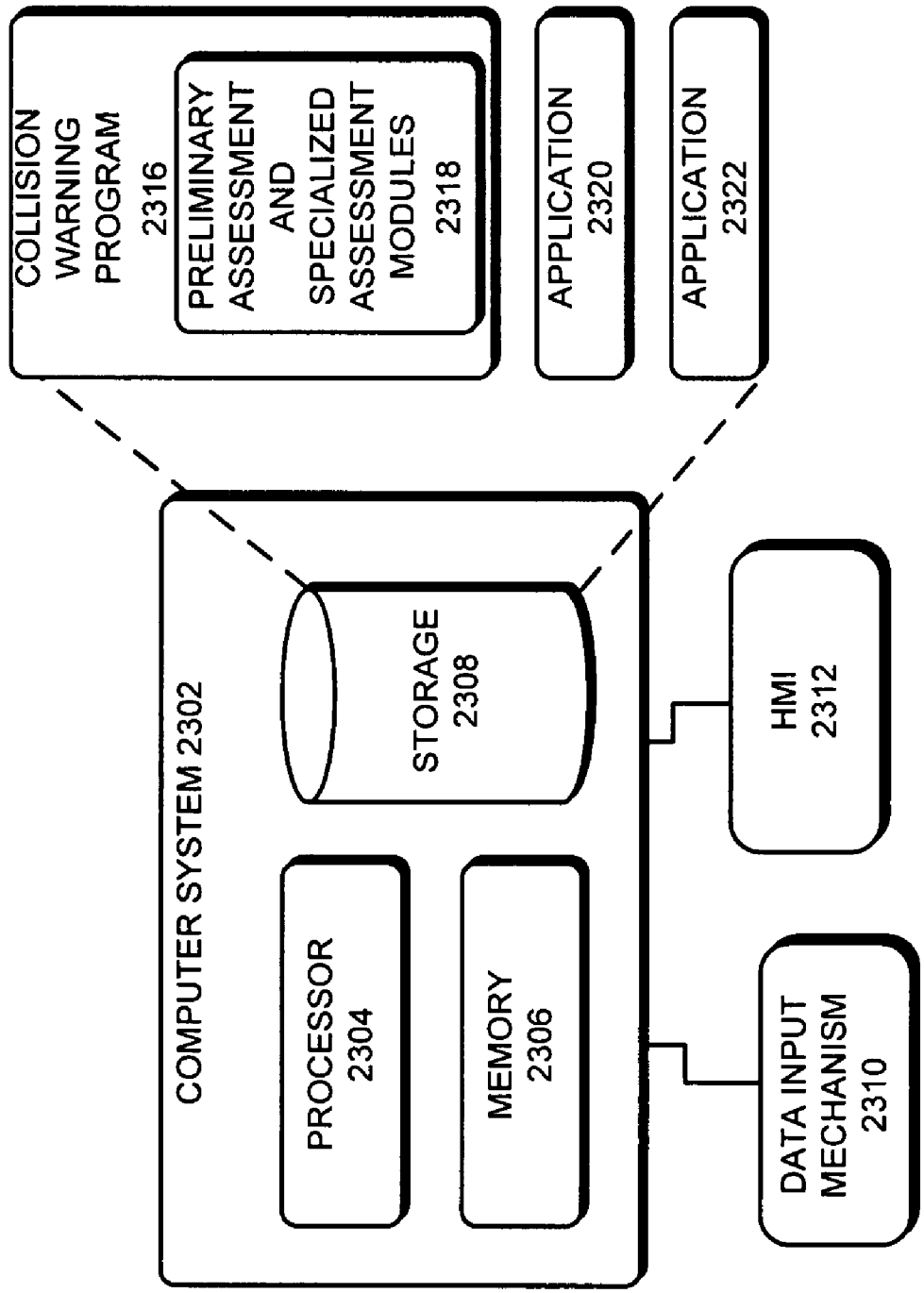
FIG. 23 illustrates an exemplary computer system that implements an early collision warning system in accordance with one embodiment of the present invention.

FIG. 23 illustrates an exemplary computer system that implements an early collision warning system in accordance with one embodiment of the present invention. A computer system 2302 includes a processor 2304, a memory 2306, and a storage device 2308. Computer system 2302 also couples to a data input mechanism 2310 and an HMI 2312. Storage device 2308 stores a collision warning program 2316, which includes preliminary assessment and specialized assessment modules 2318. Also stored in storage device 2308 are applications 2320 and 2322. During operation, collision warning program 2316 is loaded into memory 2306, and processor 2304 executes collision warning program 2316 to perform collision detection and warning.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for facilitating assessment of collision between a primary principal and a non-primary principal for early warning, the method comprising:
   receiving information which indicates a state of the primary principal and a state of the non-primary principal;
   dividing future time into a number of time intervals;
   estimating a number of possible future states of the primary and non-primary principals, wherein each future state corresponds to a time interval;
   representing the possible future states of the primary or non-primary principal as one or more 3-dimensional geometric objects in a space of which at least one dimension indicates the time, wherein a 3-dimensional geometric object indicates a location where the principal may be at a given time interval; and
   determining a probability of collision between the primary and non-primary principals, which involves determining whether 3-dimensional geometric objects for the primary and non-primary principals intersect.

2. The method of claim 1,
   wherein a projection of the 3-dimensional geometric object on the X-Y plane indicates the location of the principal; and
   wherein the Z-position of the 3-dimensional geometric object indicates the future time at which the principal is within the location corresponding to the geometric object.

3. The method of claim 1,
   wherein a geometric object comprises a bounding box that covers possible future locations of a principal at one or more future times.

4. The method of claim 1,
wherein a geometric object comprises a prismatoid;
wherein the bottom of the prismatoid corresponds to the possible location of the primary or non-primary principal at the beginning of a time interval; and
wherein the top of the prismatoid corresponds to the possible location of the primary or non-primary principal at the end of the time interval.

5. The method of claim 1,
wherein determining the probability of collision between the primary and non-primary principals comprises determining an overlap between two geometric objects which correspond to the primary and non-primary principals respectively and which correspond to the same time interval.

6. The method of claim 1,
wherein determining the probability of collision between the primary and non-primary principals comprises estimating a respective bounding box which encloses the geometric object representing a future state of the primary or non-primary principal; and
wherein the method further comprises determining whether any of the bounding boxes for the primary and non-primary principals intersect.

7. The method of claim 6,
wherein if two bounding boxes intersect, the method further comprises determining whether the geometric objects within the two bounding boxes intersect.

8. The method of claim 6,
wherein the probability of collision is computed based on the amount of overlap between the bounding boxes.

9. The method of claim 1,
wherein determining the probability of collision between the primary and non-primary principals comprises estimating a respective overall bounding box in the logical 3D space which encloses a plurality of geometric objects representing a plurality of future states of the primary or non-primary principal; and
wherein the method further comprises determining whether the overall bounding boxes for the primary and non-primary principals intersect.

10. The method of claim 1, further comprising determining a time of collision between the primary and non-primary principals.

11. The method of claim 10,
wherein determining the time of collision comprises determining the time when the geometric objects for the primary and non-primary principals first intersect.

12. The method of claim 10, further comprising determining a safe time to warn a user based on the time of collision and at least one of: a user reaction time and a safe time to stop.

13. The method of claim 1, further comprising evaluating a collision severity.

14. The method of claim 13, further comprising initializing a probability-based assessment process based on the collision severity.

15. A system for facilitating assessment of collision between a primary principal and a non-primary principal for early warning, the system comprising:
a receiving mechanism configured to receive information which indicates a state of the primary principal and a state of the non-primary principal;
a time-division mechanism configured to divide future time into a number of time intervals;
a computation mechanism configured to estimate a number of possible future states of the primary and non-primary principals, wherein each future state corresponds to a time interval;
a representation mechanism configured to represent the possible future states of the primary or non-primary principal as one or more 3-dimensional geometric objects in a space of which at least one dimension indicates the time, wherein a 3-dimensional geometric object indicates a location where the principal may be at a given time interval; and
a decision mechanism configured to determine a probability of collision between the primary and non-primary principals, which involves determining whether 3-dimensional geometric objects for the primary and non-primary principals intersect.

16. The system of claim 15,
wherein a projection of the 3-dimensional geometric object on the X-Y plane indicates the location of the principal; and
wherein the Z-position of the 3-dimensional geometric object indicates the future time at which the principal is within the location corresponding to the geometric object.

17. The system of claim 15,
wherein a geometric object comprises a bounding box that covers possible future locations of a principal at one or more future times.

18. The system of claim 15,
wherein a geometric object comprises a prismatoid;
wherein the bottom of the prismatoid corresponds to the possible location of the primary or non-primary principal at the beginning of a time interval; and
wherein the top of the prismatoid corresponds to the possible location of the primary or non-primary principal at the end of the time interval.

19. The system of claim 15,
wherein while determining the probability of collision between the primary and non-primary principals, the decision mechanism is configured to determine an overlap between two geometric objects which correspond to the primary and non-primary principals respectively and which correspond to the same time interval.

20. The system of claim 15,
wherein while determining the probability of collision between the primary and non-primary principals, the decision mechanism is configured to estimate a respective bounding box which encloses the geometric object representing a future state of the primary or non-primary principal; and
wherein the decision mechanism is further configured to determine whether any of the bounding boxes for the primary and non-primary principals intersect.

21. The system of claim 20,
wherein if two bounding boxes intersect, the decision mechanism is further configured to determine whether in the geometric objects within the two bounding boxes intersect.

22. The system of claim 20,
wherein the probability of collision is computed based on the amount of overlap between the bounding boxes.

23. The system of claim 15,
wherein while determining the probability of collision between the primary and non-primary principals, the decision mechanism is configured to:
estimate a respective overall bounding box in the logical 3D space which encloses a plurality of geometric objects representing a plurality of future states of the primary or non-primary principal; and to determine whether the overall bounding boxes for the primary and non-primary principals intersect.

24. The system of claim 15,
wherein the decision mechanism is further configured to determine a time of collision between the primary and non-primary principals.

25. The system of claim 24,
wherein while determining the time of collision, the decision mechanism is configured to determine the time when the geometric objects for the primary and non-primary principals first intersect.

26. The system of claim 24,
wherein the decision mechanism is configured to determine a safe time to warn a user based on the time of collision and at least one of: a user reaction time and a safe time to stop.

27. The system of claim 15, further comprising an evaluation mechanism configured to evaluate a collision severity.

28. The system of claim 27, further comprising an initialization mechanism configured to initialize a probability-based assessment process based on the collision severity.

29. A non-transitory computer-readable storage medium storing instructions that when executed by a computer cause the computer to perform a method for facilitating assessment of collision between a primary principal and a non-primary principal for early warning, the method comprising:

receiving information which indicates a state of the primary principal and a state of the non-primary principal;

dividing future time into a number of time intervals;

estimating a number of possible future states of the primary and non-primary principals, wherein each future state corresponds to a time interval;

representing the possible future states of the primary or non-primary principal as one or more 3-dimensional geometric objects in a space of which at least one dimension indicates the time, wherein a 3-dimensional geometric object indicates a location where the principal may be at a given time interval; and determining a probability of collision between the primary and non-primary principals, which involves determining whether 3-dimensional geometric objects for the primary and non-primary principals intersect.

* * * * *